(12) United States Patent
Nelson

(10) Patent No.: US 8,542,270 B2
(45) Date of Patent: Sep. 24, 2013

(54) 3D STEREOSCOPIC DISPLAY SYSTEM FOR LARGE FORMAT LED DISPLAYS

(76) Inventor: Bradley Nelson, Castaic, CA (US)

(*) Notice: Subject to any disclaimer, the term of this patent is extended or adjusted under 35 U.S.C. 154(b) by 634 days.

(21) Appl. No.: 12/720,099

(22) Filed: Mar. 9, 2010

(65) Prior Publication Data
US 2010/0231701 A1   Sep. 16, 2010

Related U.S. Application Data

(60) Provisional application No. 61/159,035, filed on Mar. 10, 2009.

(51) Int. Cl.
*H04N 13/04*   (2006.01)

(52) U.S. Cl.
USPC .......................................................... 348/58

(58) Field of Classification Search
None
See application file for complete search history.

(56) References Cited

U.S. PATENT DOCUMENTS

| | | | | |
|---|---|---|---|---|
| 3,903,358 | A * | 9/1975 | Roese | 348/57 |
| 4,472,708 | A * | 9/1984 | Anderson | 345/86 |
| 5,007,715 | A * | 4/1991 | Verhulst | 349/15 |
| 5,317,393 | A * | 5/1994 | Lee | 348/58 |
| 5,410,345 | A * | 4/1995 | Eichenlaub | 348/59 |
| 5,471,237 | A * | 11/1995 | Shipp | 348/46 |
| 5,537,144 | A * | 7/1996 | Faris | 348/58 |
| 5,594,843 | A * | 1/1997 | O'Neill | 345/427 |
| 5,751,388 | A * | 5/1998 | Larson | 349/96 |
| 5,896,225 | A * | 4/1999 | Chikazawa | 359/463 |
| 5,999,239 | A * | 12/1999 | Larson | 349/96 |
| 6,252,624 | B1 * | 6/2001 | Yuasa et al. | 348/56 |
| 6,310,671 | B1 * | 10/2001 | Larson | 349/96 |
| 2003/0112509 | A1 | 6/2003 | Takahashi | |
| 2003/0144420 | A1 * | 7/2003 | Tsumura et al. | 525/100 |
| 2009/0040465 | A1 * | 2/2009 | Conner et al. | 353/20 |

FOREIGN PATENT DOCUMENTS

| | | | |
|---|---|---|---|
| KR | 10-2006-0084356 A | 7/2006 | |
| KR | 10-2007-0119870 A | 12/2007 | |

OTHER PUBLICATIONS

Written Opinion of The International Searching Authority for Related Foreign Application PCT/US10/26704.
International Search Report for Related Foreign Application PCT/US10/26704.
Yamamoto H. et al., Applied Optics, vol. 41, No. 32, pp. 6907-6919, Nov. 10, 2002.

* cited by examiner

*Primary Examiner* — Joseph Ustaris
*Assistant Examiner* — Zhubing Ren
(74) *Attorney, Agent, or Firm* — Steven A. Nielsen; Allman & Nielsen, P.C.

(57) ABSTRACT

A three dimensional (3D) stereoscopic display system using large format light emitting diodes (LEDs) for displaying 3D image content. The apparatus comprises a grid of LEDs covered by two sheets of polarizing material, a first sheet of polarizing material for polarizing a first subset of the LEDs to form a first view of the 3D image, and a second sheet of polarizing material for polarizing the second subset of LEDs to form a second view of the 3D image. The sheets may be formed by cutting a plurality of openings substantially aligned with a corresponding subset of LEDs. For improved viewing, the apparatus may further comprise a rear diffuser, disposed between the LED display and the first sheet of polarizing material. Also for improved viewing, the apparatus may further comprise a front diffuser, disposed in front of the second sheet of polarizing material, for reducing glare from external light sources. Also an additional method of the application of individual polarizing buttons directly adhered to the individual LEDs incorporating an assembly key for maintaining the correct orientation of the polarizing material.

11 Claims, 14 Drawing Sheets

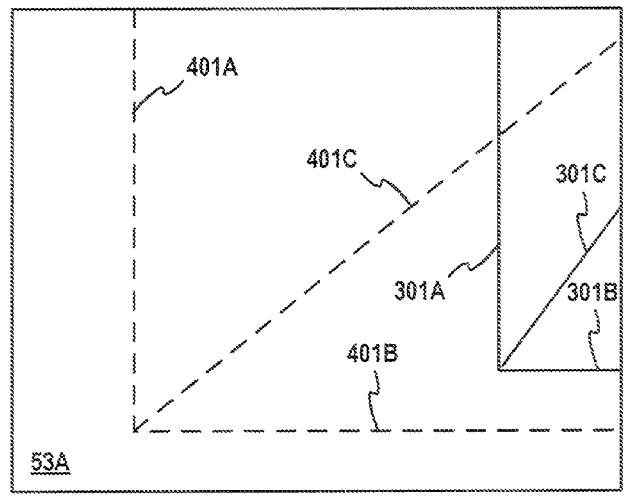
FIG. 2A
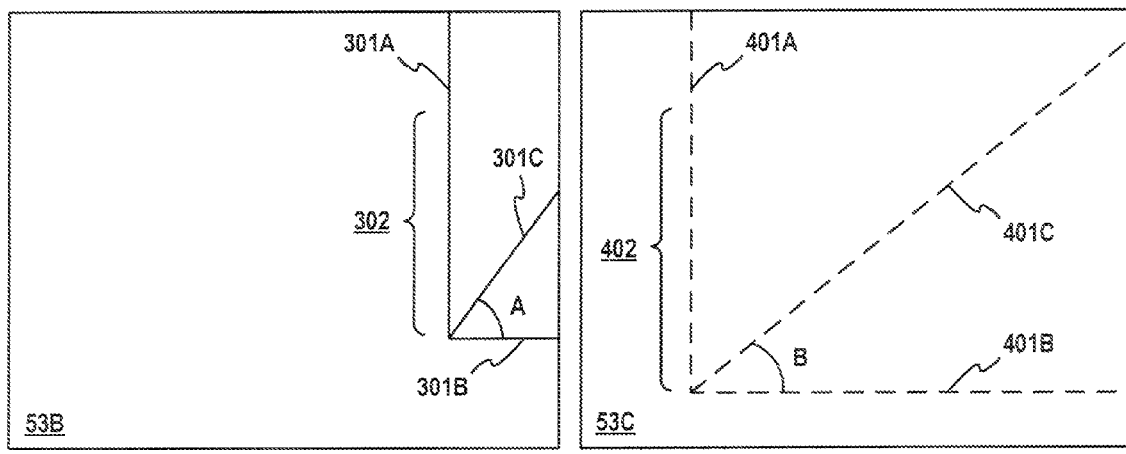
FIG. 2B
FIG. 2C

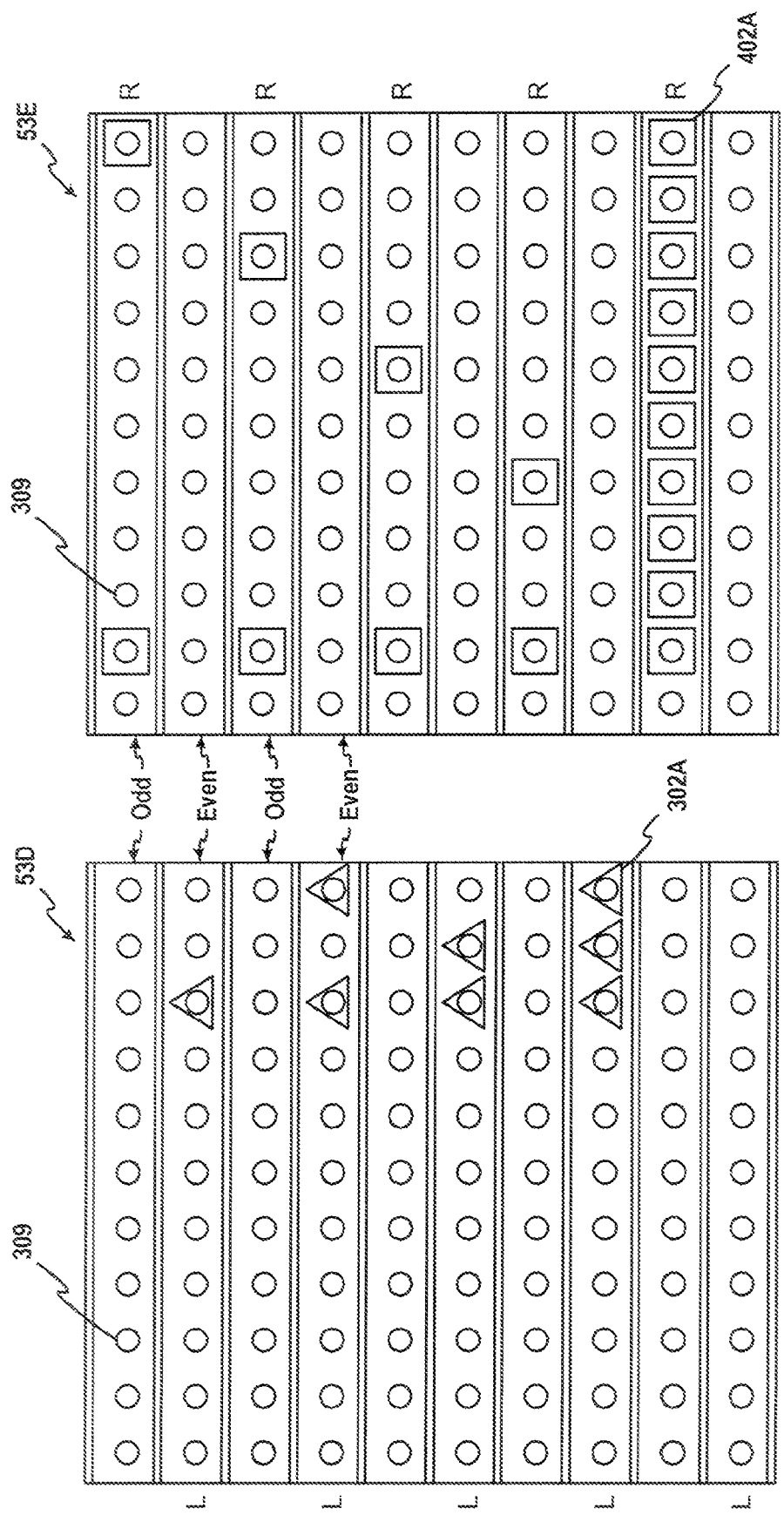

3D STEREOSCOPIC DISPLAY SYSTEM FOR LARGE FORMAT LED DISPLAYS

This application claims priority, under 35 U.S.C. §119(e), to U.S. Provisional Application No. 61/159,035, filed Mar. 10, 2009, which is expressly incorporated herein by reference.

FIELD OF THE INVENTION

The present invention generally relates to three-dimensional (3D) stereoscopic display systems. More particularly, the invention relates to the application of polarizing film material to existing large format light emitting diode (LED) display systems.

BACKGROUND

Stereoscopic display systems attempt to recreate a real world visual experience wherein a viewer sees a different view or image in each eye. In a real world viewing experience, a viewer with two eyes sees two slightly different images, as each eye is spaced apart in a slightly different viewing position. A goal of stereoscopic video display systems is to present a separate and different view to each eye of the viewer.

Certain attempts to recreate a real world visual 3D experience have used an apparatus similar to corrective eyewear comprised of a lens of one color and a lens of a second color. A monitor or projector would project two views on one screen, with each view being color coded so as to be complementary to one eyewear lens or the other. The use of color to segregate viewing channels would often lead to headaches for the viewers.

Earlier attempts were focused upon creating a 3D viewing experience within a traditional movie theater environment where movies are typically displayed. Yet, retrofitting existing billboards and other public media to achieve a 3D viewing experience remains unaddressed. Thus, there is a need for achieving a 3D viewing experience on billboards, stadium jumbotrons, or other large displays. These and other capabilities, and the advantages of such, will be made apparent when considering the following detailed specification and when taken in conjunction with the drawings.

SUMMARY OF THE INVENTION

Disclosed herein are three dimensional (3D) stereoscopic display systems using large format light emitting diodes (LEDs) for displaying 3D image content. The apparatus comprises a grid of LEDs covered by two sheets of polarizing material, a first sheet of polarizing material for polarizing a first subset of the LEDs to form a first view of the 3D image, and a second sheet of polarizing material for polarizing the second subset of LEDs to form a second view of said 3D image. The sheets may be formed by cutting a plurality of openings substantially aligned with a corresponding subset of LEDs. For improved viewing, the apparatus may further comprise a rear diffuser, disposed between the LED display and the first sheet of polarizing material. Also for improved viewing, the apparatus may further comprise a front diffuser, disposed in front of the second sheet of polarizing material, for reducing glare from external light sources.

Various methods for manufacture and assembly of the sheets of polarizing material are also disclosed including a method for the application of individual polarizing buttons to individual LED pixels. Also disclosed are various embodiments of eyewear for viewing said 3D image, the eyewear comprising a left and a right eye lens that polarizes light to create a left eye view and a right eye view.

BRIEF DESCRIPTION OF THE DRAWINGS

A brief description of the drawings follows:

FIG. 2A shows a module front plan view of the example LED module, displaying a partial right eye cube view in dashed lines and displaying a partial left eye cube view in solid lines, according to one embodiment.

FIG. 2B shows a module left channel front plan view 53B of the example LED module, according to one embodiment.

FIG. 2C shows a module right channel front plan view 53B of the example LED module, according to one embodiment.

FIG. 3A presents an illuminated left channel front view and presents a corner of a left view cube as would be illuminated by alternating even numbered rows of LEDs for creating a left eye view channel, according to one embodiment.

FIG. 3B presents an illuminated right channel front view and presents a corner of a right view cube as would be illuminated by alternating odd numbered rows of LEDs for creating a right eye view channel, according to one embodiment.

DETAILED DESCRIPTION

Figure 1A:
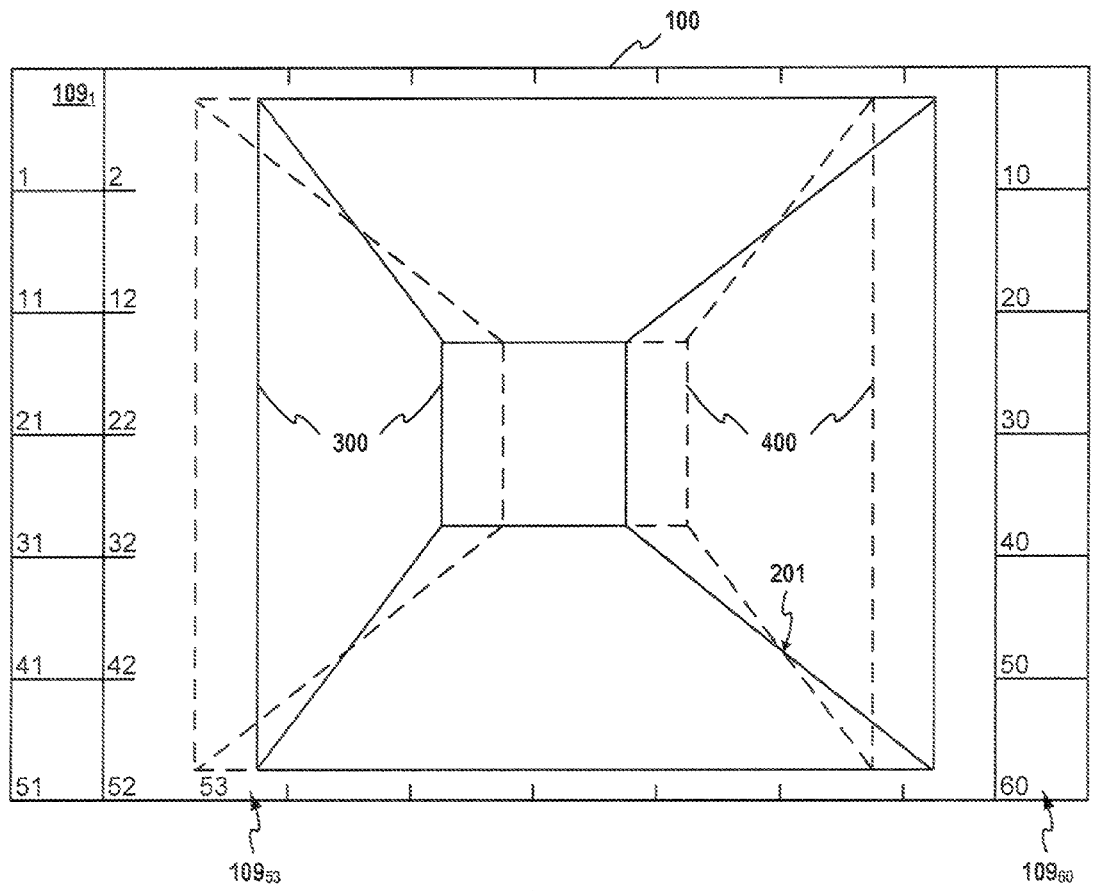
FIG. 1A is a front plan view of an LED display showing a cube, with two projections of the cube superimposed, according to one embodiment.

The following detailed description is directed to certain specific embodiments of the invention. However, the invention can be embodied in a multitude of different ways as defined and covered by the claims and their equivalents. In this description, reference is made to the drawings wherein like parts are designated with like numerals throughout.

Unless otherwise noted in this specification or in the claims, all of the terms used in the specification and the claims will have the meanings normally ascribed to these terms by those skilled in the art.

Unless the context clearly requires otherwise, throughout the description and the claims, the words "comprise", "comprising" and the like are to be construed in an inclusive sense as opposed to an exclusive or exhaustive sense; that is to say, in a sense of "including, but not limited to". Words using the singular or plural number also include the plural or singular number, respectively. Additionally, the words "herein", "above", "below", and words of similar import, when used in this application, shall refer to this application as a whole and not to any particular portion(s) of this application.

The detailed description of embodiments of the invention is not intended to be exhaustive or to limit the invention to the precise form disclosed above. While specific embodiments of, and examples for, the invention are described herein for illustrative purposes, various equivalent modifications are possible within the scope of the invention, as those skilled in the relevant art will recognize. For example, while steps are presented in a given order, alternative embodiments may perform routines having steps in a different order. The teachings of the invention provided herein can be applied to other systems, not only the systems described herein. The various embodiments described herein can be combined to provide further embodiments. These and other changes can be made to the invention in light of the detailed description.

Aspects of the invention can be modified, if necessary, to employ the systems, functions and concepts of the various patents and applications described above to provide yet further embodiments of the invention.

These and other changes can be made to the invention in light of this detailed description.

OVERVIEW

The present invention overcomes shortfalls in the related art by presenting a configuration of circular, linear or otherwise polarized or light segregating coverings to existing light emitting diode (LED) display systems. The invention achieves innovative results by the modular use of polarized material creatively fastened over LED displays for displaying 3D image content.

In one embodiment, the invention presents circular or linear polarized material with alternating rows of right or left eye viewing channels. The use of complimentary linear or circular polarized viewing lenses creates a right viewing channel through light exiting through one horizontal row of stripped film while a left eye viewing channel is created on another horizontal row of stripped film. Right and left view strips of film may be applied in alternating horizontal rows and fastened over an array of LED modules in a large format display system.

In a second embodiment, the invention presents circular or linear polarized material with overlaid sheets with pre-registered openings that align with every other single LED pixel element and offset by one pixel on each alternating row of right or left eye viewing channels. The use of complementary linear or circular polarized viewing lenses creates both a right eye viewing channel due to light exiting through the openings in the opposite left eye sheet that allows the right eye polarizing film to pass light through it, and a left eye viewing channel due to light exiting through the openings in the opposite right eye sheet that allows the left eye polarizing film to pass light through it. Right and left view sheets of polarizing material are stacked on top of each other forming a stereoscopic apparatus that may be applied or fastened over an LED display system.

Additionally, the use of a specially selected diffuser (e.g. a rear diffusion filter) for diffusing luminance of light emanated from the LEDs enhances the three-dimensional effect in two ways. First, the point light source nature of the individual LED pixels tends to "blow thru" polarization material causing a ghosting effect that may not be optimal for viewing. The addition of this rear diffusion filter spreads out the light, creating a reduced lumens per square inch value that enhances the polarization effect. Second, a rear diffusion filter also reduces the point of light from the source—effectively smoothing the overall appearance of the display—and thus making it possible to view the content on the display at a closer distance without apparent pixilation. In some embodiments, a diffuser is constructed using a diffusion film.

Additionally, the application of a specially selected diffuser (e.g. a front diffusion screen) functions as an anti-glare surface helping to reject ambient outdoor or room light from the glossy surface of the polarizing material. Some embodiments of a specially selected front diffusion screen results in a rigid structure that can be mounted over the display assembly (i.e. including over the individual LED modules). Such a front diffusion screen serves for reducing glare from light emanated from light sources external to the display assembly, and has the effect to smooth the overall appearance of the display, thus making it possible to view the content on the display at a closer distance without apparent pixilation.

Additionally, the application of individual polarizing buttons directly adhered to the individual LEDs incorporating an assembly key for maintaining the correct orientation of the polarizing material. Some embodiments use a specifically selected rear diffuser to impart characteristics to the polarizing button for reducing "blow thru". Additionally the curved top surface of the polarizing button can be frosted for enhancing the view angle and overall smoothness of the display.

The applications for this invention are numerous and enable realistic 3D viewing at both outdoor and indoor events such as concerts and sporting events or anywhere viewers can be provided with the appropriate eyewear for 3D viewing. Some embodiments are configured to facilitate quick installation and quick removal of the polarized film modules from an LED display to enable the stereoscopic function, or to return the display to a 2D viewing configuration. Various disclosed embodiments support very large display areas.

The present invention includes several embodiments of right and left view channels produced in sheets, or in horizontally applied film strips, or other types of light filtering coverings applied over LED panels.

FIG. 1A is a front plan view of an LED display showing a cube, with two projections of the cube superimposed. As shown and described, each cube projection represents a separate view channel. In the description as follows, the two cube projections may be considered to be a left eye view and a right eye view of an image of the cube. Further, FIG. 1A depicts a display assembly 100, having an LED array comprised of sixty individual LED modules, which array of modules comprises the arrayed display, namely display assembly 100.

As shown, the sixty LED modules (e.g. LED module $109_1$, LED module $109_{53}$, LED module $109_{60}$, etc) comprising the sample display assembly 100 are composed of six rows and ten columns, each cell labeled by integer values, as "1", "2", "10", "11" . . . "53", "60". Each LED module (e.g. LED module $109_1$, LED module $109_{53}$, LED module $109_{60}$, etc) in turn may be comprised of any number of rows and any number of columns of LED pixels. Of course, the number of individual LED modules may be increased or decreased to form a larger or smaller display, or the size of the individual LED modules may be increased or decreased to form a larger or smaller display. To generate the perception of a 3D (three-dimensional) wireframe cube, a left view cube 300 is illuminated within certain alternating rows or pixels of LEDs and a right view cube 400 is illuminated within other certain alternating rows or pixels of LEDs. In the desired stereoscopic view of a 3D wireframe cube, the cube is perceived as a hollow 3D wireframe cube. The perception is of the 3D cube being produced by the combination of a left view cube 300 (e.g. as perceived by a first eye) and a right view cube 400 (e.g. as perceived by a second eye). Of course, the human perception of a stereoscopic view may be emulated by a plurality of cameras (e.g. two cameras) viewing the 3D wireframe cube (or any other image, for that matter) using camera lenses separated in space so as to, at least in part, emulate the interocular distance between the eyes of a human viewer. Thus, capturing a stereoscopic view of a 3D wireframe cube can be performed by a pair (or more) of cameras, where a stereoscopic view of the 3D cube is produced by the combination of a left view cube 300 (e.g. as perceived by a first camera) and a right view cube 400 (e.g. as perceived by a second camera).

Using one technique to replicate perception of a real world viewing experience, the right view cube 400 is presented in a position consistent with the view that would be perceived by the right eye of a viewer observing a real (e.g. three-dimensional) cube. More specifically, in FIG. 1A, the projected position of a cube observed by a right eye is presented in dashed lines.

Figure 1B:
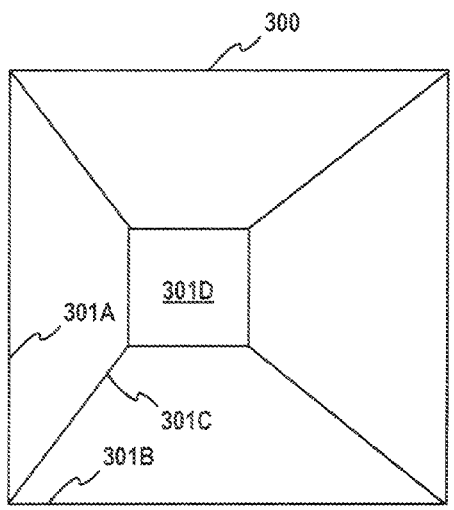
FIG. 1B is a perspective view of a cube designated as a left eye view and shown as solid lines, according to one embodiment.

FIG. 1B is a perspective view of a cube designated as a left view cube 300 and shown as solid lines. Certain segments are labeled, namely, left eye height segment 301A, left eye width segment 301B, and left eye depth segment 301C. More specifically, FIG. 1B presents a left eye view of a perception of a 3D wireframe cube, namely the left view cube 300. In one perception, the smaller box 310D in the centre of a perceived 3D wireframe cube will appear to be in the distance (i.e. positioned at the distant rear of the cube) as if the viewer is looking into a box (i.e. a hollow, wireframe cube) instead of perceiving as if looking at the top of a flat-topped pyramid.

Figure 1C:
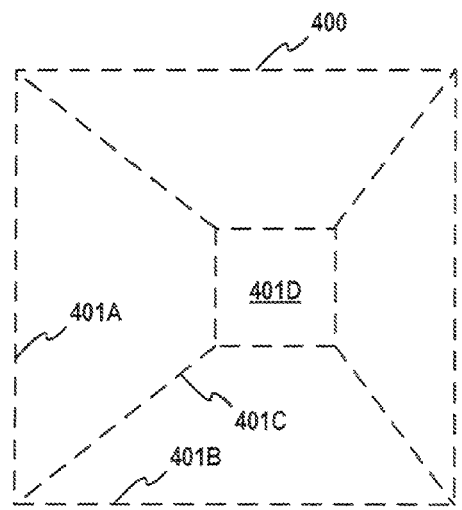
FIG. 1C is a perspective view of a cube designated as a right eye view and shown as dashed lines, according to one embodiment.

FIG. 1C is a perspective view of a cube designated as a right view cube 400 and shown as dashed lines. Certain segments are labeled, namely, right eye height segment 401A, right eye width segment 401B, and right eye depth segment 401C. The segment labeled as right eye width segment 401B of the cube appears to be protruding out in front of the display, forcing the viewer's eyes to converge at that portion of the cube. Human visual perception determines distance by correlating the relative separation of vertical and horizontal edges. In fact, the human perception of sight will fuse two images (e.g. the left view cube 300 and the right view cube 400) into one image creating the perception of depth. Note that, in FIG. 1C, the right eye view is shown as having a right eye height segment 401A, a right eye width segment 401B, and a right eye depth segment 401C. Such is the same effect that is perceived when a viewer holds a pencil up close to the eyes, forcing the viewer's eyes to cross. The brain interprets this as an object that is close to the viewer. At any point that the left and right eye views intersect (see intersection point 201 in FIG. 1A), this intersection will be perceived as a point that is at the screen plane, whereas other points not perceived to be at the screen plane are perceived to be either protruding (closer to the viewer) or recessed (father from the viewer). Another example of such an intersection point is found in FIG. 1A at or near the fifth row and at or near the fourth column. If all of the displayed content is congruent (i.e. intersecting everywhere), and there is no separation between the left and right views, this will be perceived as a two-dimensional (2D) image. The intersection point 201 is one of four points shown where the left view cube 300 and right view cube 400 views of the two respective cubes intersect and may appear to be at the plane of the screen.

FIG. 1A can be considered to represent the projection of a right view channel in dashed lines and the projection of a left view channel in solid lines. Both views are projected upon the same single display assembly 100. For purposes of explanation, the views presented in FIG. 2A through FIG. 6 present various views of LED module 53 (which LED module 53 is found at the bottom row and third column of FIG. 1A, and the area at LED module 53 is labeled $109_{53}$). In further detail, LED module 53 is an arbitrarily-selected module selected from among the sixty modules of display assembly 100.

The area of the display assembly 100 that is covered by LED module 53 presents the lower left corner of right view cube 400. The lower left corner of the right view cube 400 is presented in a position toward the left side of the area covered by LED module 53. Similarly, the area of the display assembly 100 that is covered by LED module 53 presents the lower left corner of left view cube 300 and the lower left corner of right view cube 400. The lower left corner of the left view cube 300 is presented in a position toward the right side of the area covered by LED module 53.

FIG. 1B is a wireframe representation of a cube in a left view cube 300, which is presented in FIG. 1A and FIG. 1B as solid lines. The left view cube 300 is a projection used herein to illustrate the contents of a left view channel. The smaller left-of-center square represents the back wall of the cube. That is, the smaller square shown toward the left represents the left inner back surface 301D of the cube. The front lower left vertical edge segment, namely the left eye height segment 301A, reaches the front lower left corner of the cube, intersecting with the front lower left horizontal edge segment, namely left eye width segment 301B and the front lower left diagonal depth segment 301C.

While the front lower left diagonal edge segment (left eye depth segment 301C) is presented at an angle of approximately 70 degrees—as measured from the front lower left horizontal edge segment 301B, in a real world view, the left eye depth segment 301B would be seen as single line on the same plane as the right eye depth segment 401B, the single vertical pixel offset will not be perceived by the viewer when wearing the matching polarized glasses.

FIG. 1C is a wireframe representation of a cube in a right view cube 400, which is presented in FIG. 1A and FIG. 1C as dashed lines. The right view cube 400 is a projection used herein to illustrate the contents of a right view channel. The smaller right-of-center square represents the back wall of the cube. That is, the smaller square shown toward the right represents the left view inner back surface 401D of the cube. The left front vertical edge segment is marked as right eye height segment 401A and the lower front horizontal edge segment is marked as right eye width segment 401B. The line segment representing the left lower inside edge leading to the back of the box is marked as the right eye depth segment 401C. The right eye depth segment 401C is presented at an angle of approximately 50 degrees as measured from lower front horizontal edge, namely the right eye width segment 401B.

FIG. 2A shows a module front plan view 53A of the example LED module 53, displaying a partial right eye cube view in dashed lines and displaying a partial left eye cube view in solid lines. The module front plan view 53A is a rendition of LED module 53 wherein the left view channel of right view cube 400 is illustrated in dashed lines and wherein the left view cube 300, is illustrated in solid lines.

More specifically, module front plan view 53A depicts a portion of the right eye height segment 401A, right eye width segment 401B, and right eye depth segment 401C, all as shown on the left side of FIG. 2A within module front plan view 53A. Similarly, module front plan view 53A depicts a portion of the left eye height segment 301A, left eye width segment 301B, and left eye depth segment 301C, all as shown on the right side of FIG. 2A within module front plan view 53A.

The module front plan view 53A is an enlargement of LED module 53 as found in FIG. 1A. Additionally, FIG. 2A shows the horizontal offset between the front horizontal edge, namely left eye width segment 301B and right eye width segment 401B for left view cube 300 and right view cube 400, respectively. As in FIG. 1A, FIG. 2A shows left view cube 300 as solid lines and right view cube 400 as dashed lines. Both views contain the lower left corner of left view cube 300 and the lower left corner of right view cube 400.

FIG. 2B shows a module left channel front plan view 53B of the example LED module 53. As shown, the module left channel front plan view 53B uses solid lines to represent a left view cube 300. The previously described left eye height segment 301A, left eye width segment 301B, and left eye depth segment 301C are shown at the right side of module left channel front plan view 53B. More particularly, FIG. 2B presents a module left channel front plan view 53B which is an isolated view of various features of left view cube 300. A reference bracket 302 is used to include segments 301A, 301B and 301C.

The angle marked as "A" illustrates an angle of approximately 70 degrees and is measured between left eye width segment 301B and left eye depth segment 301C for left view cube 300. Angle "A" is shown to be greater than the analogous angle "B" of the right view cube shown in FIG. 2C (see description of FIG. 2C below).

FIG. 2C shows a module right channel front plan view 53C example LED module 53 displaying dotted lines to represent a right eye cube view. The previously described the right eye height segment 401A, right eye width segment 401B, and right eye depth segment 401C are shown at the left side of view module right channel front plan view 53C. More particularly, FIG. 2C presents a module right channel front plan view 53C which is an isolated view of various features of right view cube 400. A reference bracket 402 is used to include segments 401A, 401B and 401C.

The angle marked "B" illustrates an angle of approximately 50 degrees and is measured between right eye width segment 401B and right eye depth segment 401C for right view cube 400. Angle "B" is shown to be less than the analogous angle "A" of the left view cube shown in FIG. 2B.

The difference between angles "A" and "B" is due to the different views presented by left view cube 300 and right view cube 400 when each view is segregated into a left view channel and a separate right view channel.

FIG. 3A presents an illuminated left channel front view 53D which is an alternate representation of the view 53B of FIG. 2B, and presents a corner of a left view cube 300 as would be illuminated by the even rows of LEDs for creating a left eye view channel. As shown, the illuminated left channel front view 53D is a rendition of LED module 53 using triangles on even rows to enclose left eye pixels 302A that represent illuminated LEDs projecting a portion of the front lower corner cube lines indicated by bracket 302 of FIG. 2B.

Each illuminated LED representing left eye pixels 302A is enclosed with a triangle. In this particular example, even numbered rows of LEDs are used to display a left eye view channel. The lines indicated within bracket 302 of LED module 53B are shown in FIG. 3A as illuminated LEDs marked with a plurality of triangles, each similar in representation to triangle enclosing pixel 302A.

FIG. 3B presents an illuminated right channel front view 53E which is an alternate representation of the view of LED module 53C of FIG. 2C, and presents a corner of a right view cube 400 as would be illuminated within alternating odd numbered rows of LEDs for creating a right eye view channel. As shown, the illuminated right channel front view 53E is a rendition of LED module 53 using squares on odd rows to enclose right eye pixels 402A that are illuminated LEDs projecting a portion of the front lower corner cube lines indicated by bracket 402 of FIG. 2C.

Each illuminated LED representing a right eye pixel 402A is enclosed with a square. In this particular example, odd rows of LEDs are used to display a right eye view channel. The lines indicated within bracket 402 of view 53C are shown in FIG. 3B as illuminated LEDs marked with a plurality of squares, each similar in representation to square enclosing pixel 402A.

FIG. 3A and FIG. 3B each show detailed enlargements of LED module 53 from FIG. 1A. Both FIG. 3A and FIG. 3B illustrate various rows and columns of LEDs, each position marked as circles 309 oriented within each row and column. Various embodiments of the invention contemplate that any circled position (e.g. any of circles 309) may comprise a sub-array of LEDs, any of which are capable of producing a full range of colors.

Modules such as are depicted in illuminated left channel front view 53D and/or as are depicted in illuminated right channel front view 53E may be comprised of columns and rows of LEDs of various sizes (for example, a size/area of two square feet). Alternatively, modules may be comprised of LEDs in an array substantially larger. Such a modular design facilitates the retrofitting of a range of LED display systems to comport with the principles of the 3D stereoscopic display system for large format LED displays disclosed herein.

Following the foregoing discussions of FIG. 3A and FIG. 3B, various embodiments of the invention contemplate an assembly comprising two sheets of polarizing film, a first sheet polarized for the left eye and a second sheet polarized for the right eye. In further embodiments, the sheets of polarized film are die cut in a pattern with an array of pre-registered openings, the pattern arranged so that the cut openings will align with every other LED pixel element in a row, and alternate shifted by one pixel on each consecutive row. Such and similar embodiment are further disclosed in the following.

Figure 4A:
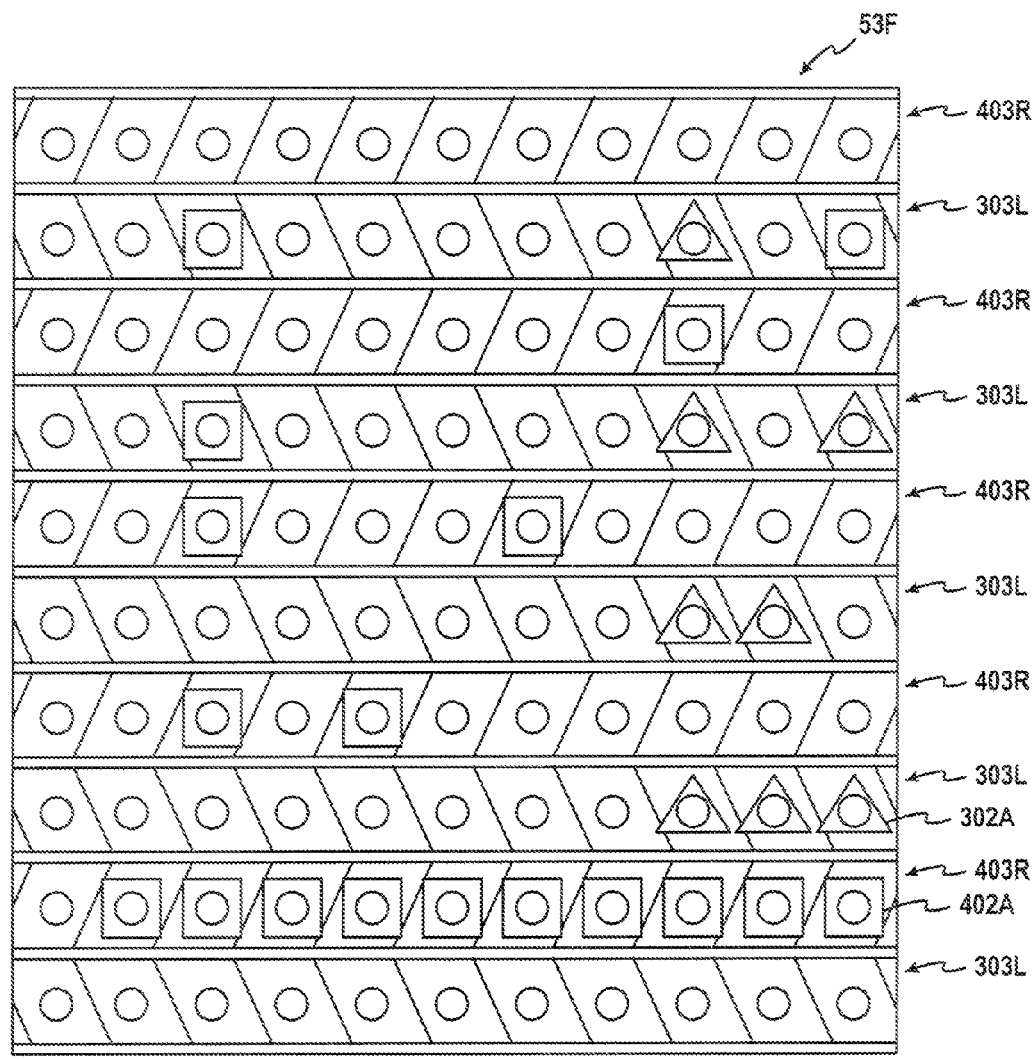
FIG. 4A is a front plan view of a detailed enlargement of a display assembly, according to one embodiment.

FIG. 4A is a front plan view of a detailed enlargement of a display assembly 100. As shown, FIG. 4A depicts a front view 53F which shows, inter alia, the combined rows of FIG. 3A and FIG. 3B such that both a right cube view and a left cube view are presented overlaid on one screen.

FIG. 4A uses diagonal lines to separate each LED pixel (shown as circles 309). Diagonal lines slanting upward, from the left to the right, on odd rows are shown to be right view rows, and are viewable via the matching slanting lines of the right lens 404 of the eyewear for viewing 500 shown in FIG. 4B. Diagonal lines slanting downward, from the left to the right, on rows marked as 303L are shown to be left view rows, and are viewable via the matching slanting lines of the left lens 304 of the eyewear for viewing 500 shown in FIG. 4B. FIG. 4A uses the triangle and square markings of FIG. 3A and FIG. 3B to designate a right view projection or left view projection. The squares represent a plurality of pixels for a right eye channel (e.g. right eye pixel 402A) and the triangles represent a plurality of pixels for a left eye channel (e.g. left eye pixel 302A).

Also shown in FIG. 4A are right eye strips 403R and left eye strips 303L. Strips 303L and 403R may be fitted with one or more filters for linear polarization, circular polarization, or other means of separating one view from another view. The alternating strips (i.e. alternating left eye strips 303L and right eye strips 403R) may be fitted over alternating rows of LEDs. Thus, an arrangement of filters for light polarization placed over a plurality of light emitting diodes (LEDs) can result in a display suited for displaying 3D image content to viewers who are viewing through left and right lenses that are polarized in a complementary fashion. Such arrangements and several specific embodiments of left and right lenses that are polarized in a complementary fashion are disclosed below.

Figure 4B:
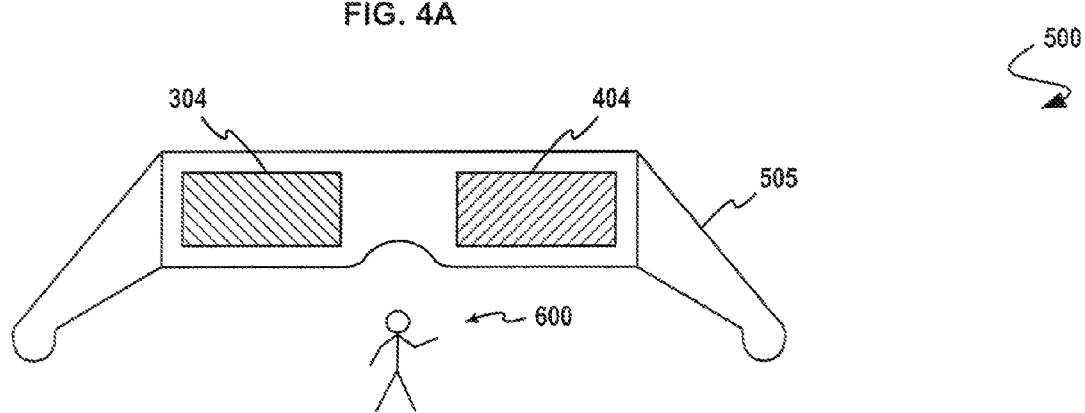
FIG. 4B shows a perspective view of a pair of eyewear for viewing with a left lens 304 and a right lens mounted in a stabilizing frame, according to one embodiment.

FIG. 4B shows a perspective view of a pair of eyewear for viewing 500 with a left lens 304 and a right lens 404 mounted in a stabilizing frame 505. The designations of right and left are taken from the perspective of a viewer 600 looking through the eyewear for viewing 500, as shown in the foreground of FIG. 4B. Any of eyewear left lens 304 and/or of eyewear right lens 404 may be fitted with a lens providing circular or linear polarization and will thus decode the right or left view presented by the display assembly 100. The eyewear for viewing 500 shown in FIG. 4B may be of the common disposable paper stabilizing frame type. Of course, many other types of frames for the eyewear for viewing 500 are reasonable and contemplated (e.g. including but not limited to construction using a solid plastic frame, construction using a folding plastic frame, construction using a wire frame, etc.).

In the present example, when wearing the eyewear for viewing 500, the left eye of the viewer 600 will see only the left eye pixels 302A of illuminated LEDs (designated by triangles in FIG. 4A) and the right eye of the viewer 600 will see only the right eye pixels 402A (designated by squares in FIG. 4A).

In other embodiments, the eyewear for viewing 500 a 3D image may be constructed using the aforementioned polarizing material to create a left eye lens, and the aforementioned polarizing material to create a right eye lens. Thus, the eyewear for viewing 500 a 3D image can be constructed comprising a left eye lens and a right eye lens that polarizes light complementary to the aforementioned first and second sheets of polarizing material.

Again referring to FIG. 4A, in some embodiments, a polarizing material may be sized to fit over an LED module 53, and formed or cut with pre-registered openings arranged such that the openings align with every other LED pixel element in an even column and in a first row (e.g. first rows indicated as 403R), and further formed or cut with pre-registered openings arranged such that the openings align with every other LED pixel element in an odd column and in a second row, thus shifting the openings between even column and odd columns (i.e. shifting/alternating by one pixel) on each consecutive row.

Following the above description, a display assembly may be constructed using LEDs (or the aforementioned multi-LED LED modules) whereby the LEDs are disposed in a grid pattern and whereby a first view (e.g. a left eye channel) is formed using a polarizer for overlaying only LEDs situated in a first set of alternating horizontal rows opposite the second set of alternating horizontal rows, and a second view (e.g. a right eye channel) is formed using a polarizer for overlaying only LEDs situated in a second set of alternating horizontal rows opposite the first set of alternating horizontal rows.

Figure 5B:
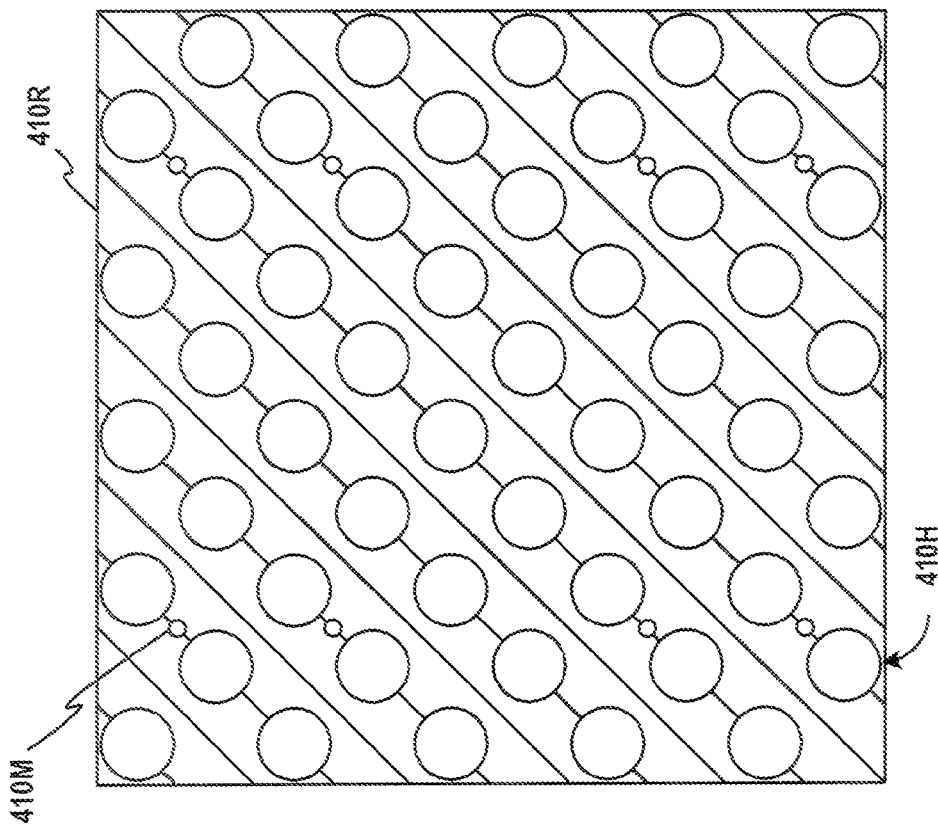
FIG. 5B shows a front plan view of a sheet of polarizing material for displaying the right eye view channel, according to one embodiment.
Figure 5A:
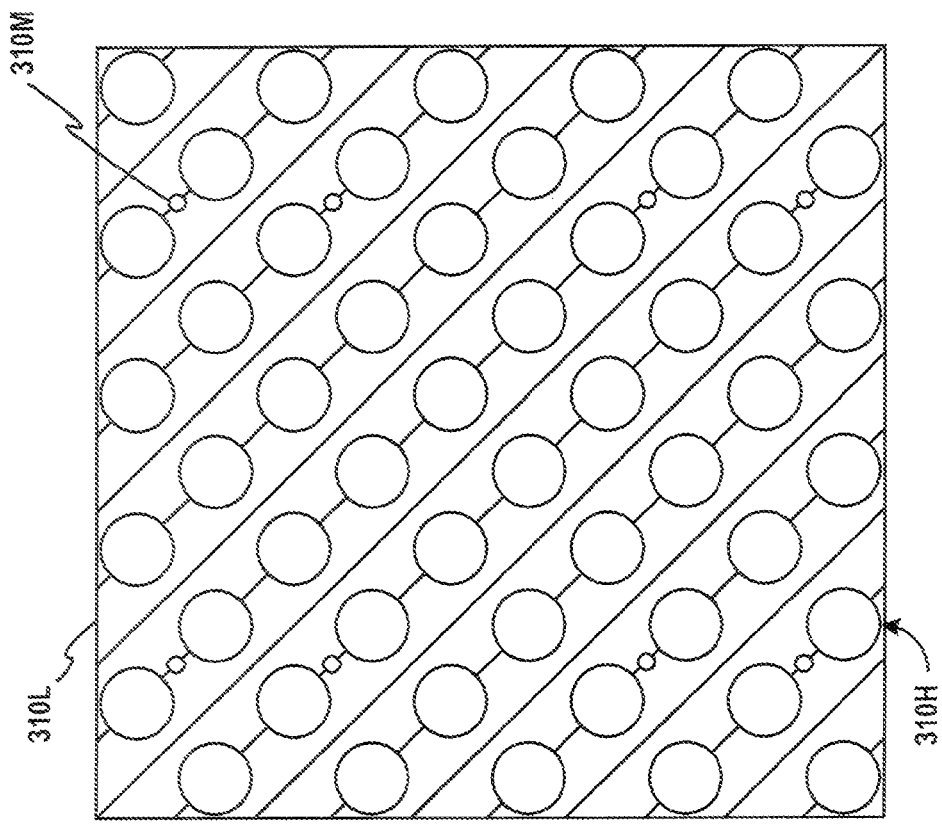
FIG. 5A shows a front plan view of a sheet of polarizing material for displaying the left eye view channel, according to one embodiment.

FIG. 5A shows a front plan view of a sheet of polarizing material for displaying the left eye view channel. As shown, FIG. 5A includes a single left polarizing overlay 310L of left eye view polarizing material cut to fit over a single module with pre-registered openings (such as opening 310H) arranged so that the openings will align as above-described, with the openings cut in a pattern opposite the adjacent pixel pattern of right polarizing overlay 410R—with every other LED pixel element being shifted by one pixel on each alternating even/odd row. The downward slanting, from left to right, lines represent the area of the sheet material remaining after the openings have been cut out. The eight smaller circles (e.g. mounting feature 310M) represent holes for the mounting fasteners, according to one embodiment.

FIG. 5B shows a front plan view of a sheet of polarizing material for displaying the right eye view channel. As shown, FIG. 5B includes a single right polarizing overlay 410R of right eye view polarizing material cut to fit over a single module with pre-registered openings (such as opening 410H) arranged so that the openings will align as above-described, with the openings cut in a pattern opposite the adjacent pixel pattern of left polarizing overlay 310L—with every other LED pixel element being shifted by one pixel on each alternating even/odd row. The upward slanting, from left to right, lines represent the area of the sheet material remaining after the openings have been cut out. The eight smaller circles (e.g. mounting feature 410M) represent holes for the mounting fasteners, according to one embodiment.

Figure 6:
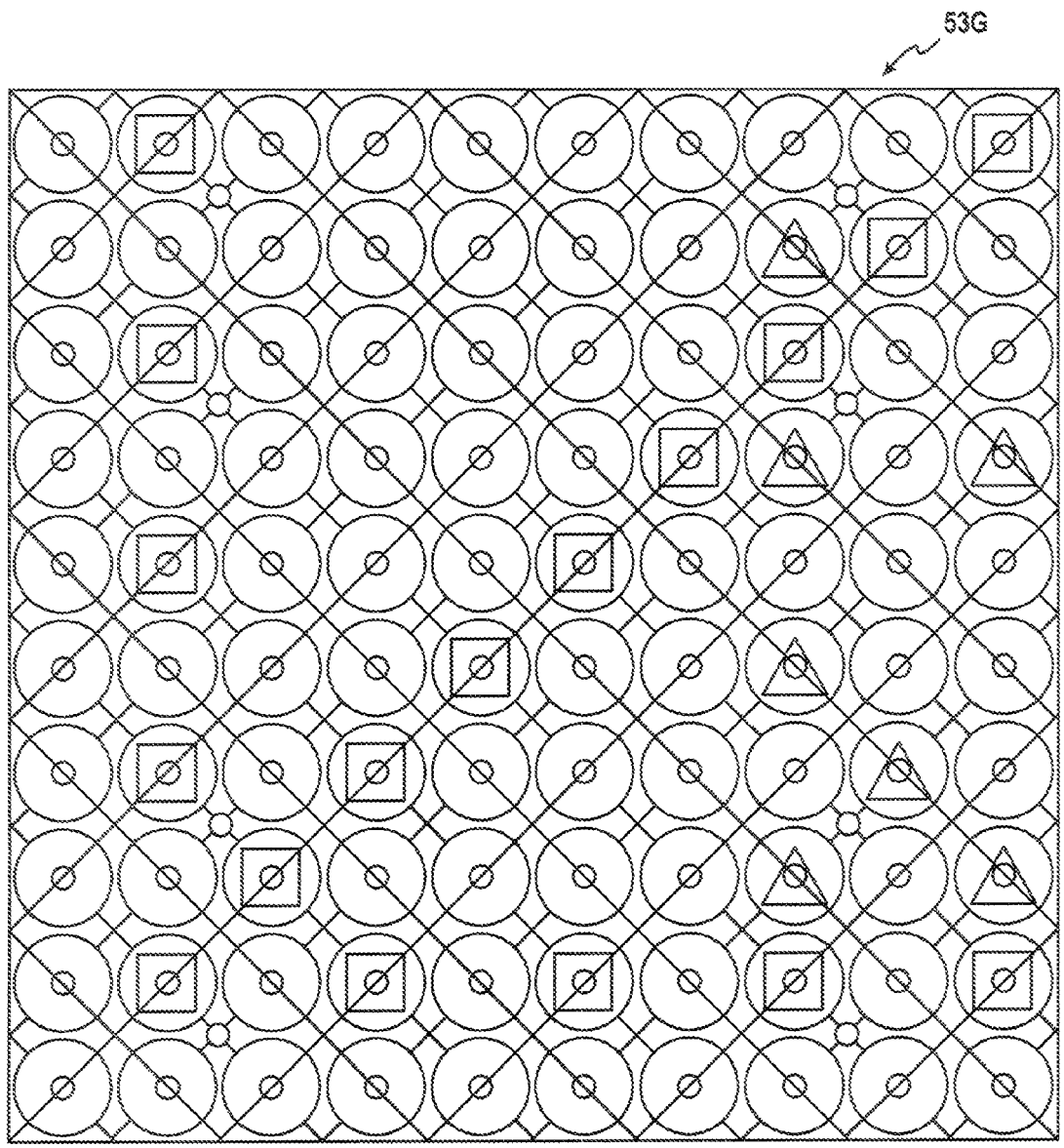
FIG. 6 shows a front plan view of a detailed enlargement of an LED module, according to one embodiment.

FIG. 6 shows a front plan view of a detailed enlargement of an LED module 53. As shown, FIG. 6 depicts combination front view 53G which shows, inter alia, the combination of sheets of a left polarizing overlay 310L and a right polarizing overlay 410R such that both a right cube view and a left cube view are both presented using only one display assembly 100. The depicted view includes an array of pre-registered openings and showing an example of an array of illuminated LEDs marked within squares to show portions of right view cube 400 and an array of pre-registered openings, and further showing an example of an array of illuminating LEDs marked in within triangles to show portions of left view cube 300. FIG. 6 includes the use of diagonal lines to separate each LED pixel (each pixel shown as a small circle). Diagonal lines slanting downward, from the left to the right, correspond to left polarizing overlay 310L and the bisected left viewable pixels are viewable via the left lens 304 of the eyewear for viewing 500. Diagonal lines slanting upward, from the left to the right, correspond to right polarizing overlay 410R and the bisected right viewable pixels and are viewable via the right lens 404 of the eyewear for viewing 500. Note that the pattern of the illuminated pixels in FIG. 6 is different from the pattern of the illuminated pixels in FIG. 4A. Still, human perception of the pattern of the viewable result is the same for both patterns when viewed from a sufficient distance.

Following the above description, a display assembly may be constructed using LEDs (or the aforementioned multi-LED LED modules) whereby the LEDs are disposed in a grid pattern and wherein said first view (e.g. a left eye channel) comprises LEDs situated in a first set of alternating diagonal lines across the grid, opposite said second set of alternating diagonal rows, and said second view (e.g. a right eye channel) comprises LEDs situated in a second set of alternating diagonal lines across the grid, opposite said first set of alternating diagonal rows.

In some embodiments (as described above) the left polarizing overlay 310L and/or the right polarizing overlay 410R may be formed from a single sheet of material. In other embodiments, a polarizing overlay may be formed using strips, possibly with mounting holes provided between the rows of pixels.

A method of fabricating oppositely aligned polarizing overlays with checkerboard-aligned openings cut in them is described in the following paragraphs. As may now be recognized, the first checkerboard pattern of left-polarized material (with openings) overlaid with a second checkerboard pattern of right-polarized material (with openings) may be regarded as optical windows and are analogous to binary (e.g. ON or OFF) gates in an array with alternating row patterns, thus creating an array with a checkerboard pattern such as the following:

```
1010101010
0101010101
1010101010
0101010101
```

Thus, by making one die thru-cut to cut an even number of the sheets, and rotating the even sheets by one hundred eighty degrees (or rotating the odd sheets by one hundred eighty degrees) and superimposing them, only a single die cut is needed to punch the openings in both left and right eye polarizing material. When the die cut arrangement is symmetric, the two sheets become self-aligning. Also, an optical barrier is also created at the non-pixel locations since the oppositely polarizing sheets, when overlaid, block light, thereby eliminating the need for an optical barrier component and the associated fabrication steps. Additionally, the size and shape of these openings can be formed to an oval shape, or square shape, or other shape in order to optimize the amount of light passed through the film. In some cases the shape of the openings increases (or decreases) the amount of light when perceived at different viewing angles.

In fact, disclosed herein are various methods to optimize the amount of light passed through the film, thereby increasing an angle for viewing a 3D image. From the foregoing, it can be observed that a display assembly 100 operates (in part) by emanating light produced by a plurality of pixels that are arranged in a grid pattern. As shown in the figures and as described for the selected embodiments, the grid of pixels exhibits separation between pixels, leaving some "noisy" areas in between individual pixels. One way to optimize the amount of light passed through the film, thereby increasing an angle for viewing a 3D image is to reduce the amount of light emanating from the noisy areas. This can be accomplished by aligning a plurality of openings of a first sheet of polarizing material to a first subset of pixels (the first sheet of polarizing material for polarizing light in a first polarizing direction) and aligning a plurality of openings of a second sheet of polarizing material to a second subset of pixels (the second sheet of polarizing material for polarizing light in a second polarizing direction opposite from said first polarizing direction). Thus, it can be said that the combination of the first and second polarizing material serves to filter (e.g. reduce in intensity) the light emanating from the (noisy) separation area among said pixels. The desired light (i.e. the light other than from the noisy areas) then allows for an increased viewing angle for viewing a 3D image. In fact, application of such filters permits viewing from a greater angle (i.e. such angle measured from a normal vector, perpendicular to the face of the display assembly) without causing distortion of the 3D image.

Figure 7A:
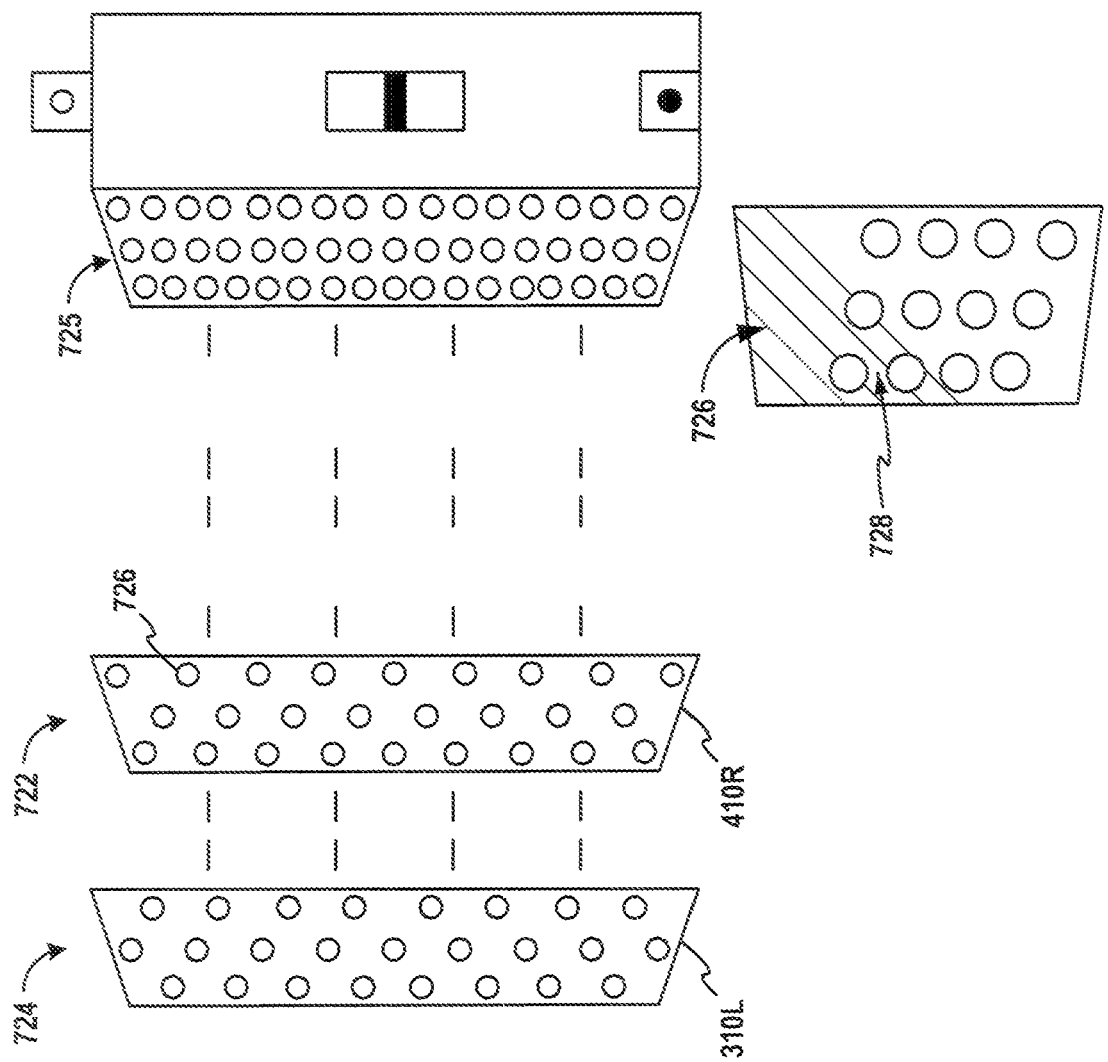
FIG. 7A depicts an assembly using multiple sheets of polarized material, according to one embodiment.

FIG. 7A depicts an assembly using multiple sheets of polarized material. The figure depicts an assembly for a 3D stereoscopic display system for large format LED displays comprising a grid of pixels 725 for displaying 3D image content. The grid of pixels 725 may be comprised of light emitting diodes in a grid, such that the grid of pixels are displaced by a separation area 728 located in between the pixels in the grid. In the embodiment shown, the separation area 728 located in between the pixels combine into a contiguous separation area 726 (shown as diagonal lines). Following the assembly of FIG. 7A, the contiguous separation area 726 may be doubly-polarized (thus not allowing light to pass) by aligning a plurality of openings of a right-polarized sheet of polarizing material 722 to a first subset of pixels, and aligning a plurality of openings of a left-polarized sheet of polarizing material 724 to a second subset of pixels. Thus, the combination of the two sheets, so oriented blocks the light emanated from the pixels that are adjacent to the separation area surrounding the pixels so as to increase an angle to view said 3D image. In the embodiment shown, the first subset of pixels may be a set completely disjoint from the second subset of pixels. Or, at least for purposes of doubly polarizing the contiguous separation area 726, the first subset of pixels may intersect the second subset of pixels, and the intersection may be a partial intersection or a complete intersection.

Figure 7B:
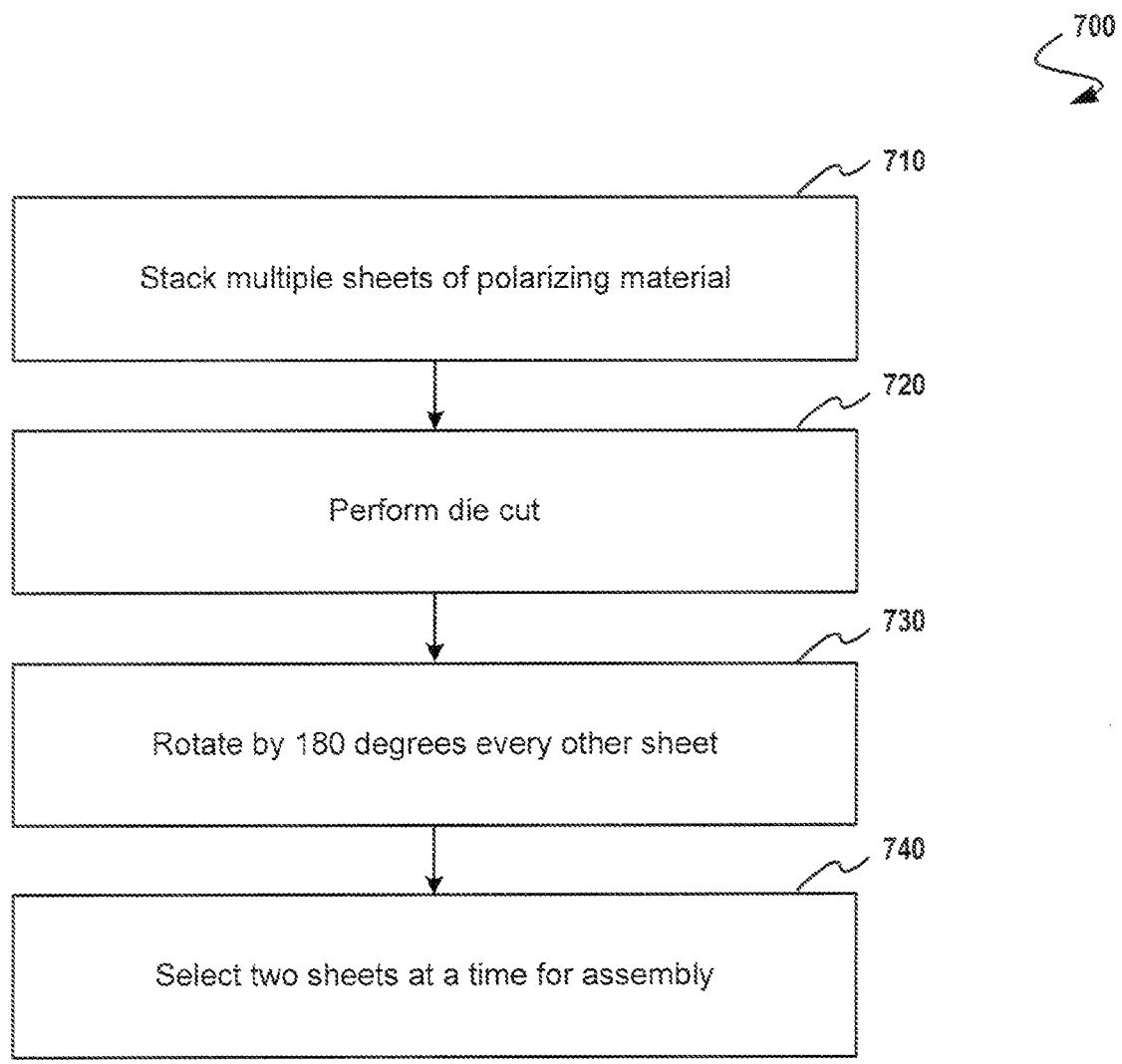
FIG. 7B depicts a block diagram of a method to perform manufacture of sheets of polarized material, according to one embodiment.

FIG. 7B depicts a block diagram of a method to perform manufacture of sheets of polarized material. As an option, the present system 700 may be implemented in the context of the architecture and functionality of the embodiments described herein. Of course, however, the system 700 or any operation therein may be carried out in any desired environment. As shown, system 700 comprises a plurality of steps, the steps for:

Stacking multiple sheets of polarizing material (see step 710)
Performing die cuts (see step 720)
Rotating, by 180 degrees, every other sheet (see step 730)
Selecting two sheets at a time for assembly (see step 740)

A generalized method for fabricating a polarizer (possibly using multiple sheets of polarizing material) can be described as comprising steps for stacking a plurality of sheets of polarizing material, cutting openings in a first sheet of polarizing material in accordance with a 3D content format, rotating a second sheet of polarizing material 180 degrees, cutting openings in the second sheet of polarizing material in accordance with the 3D content format, and selecting a pair of first and second sheets of polarizing material for assembly. With respect to the embodiments of this FIG. 7, the 3D content format may comprise a checkerboard arrangement, an alternating row arrangement, an alternating column format, or any other arrangement.

Figure 8A:
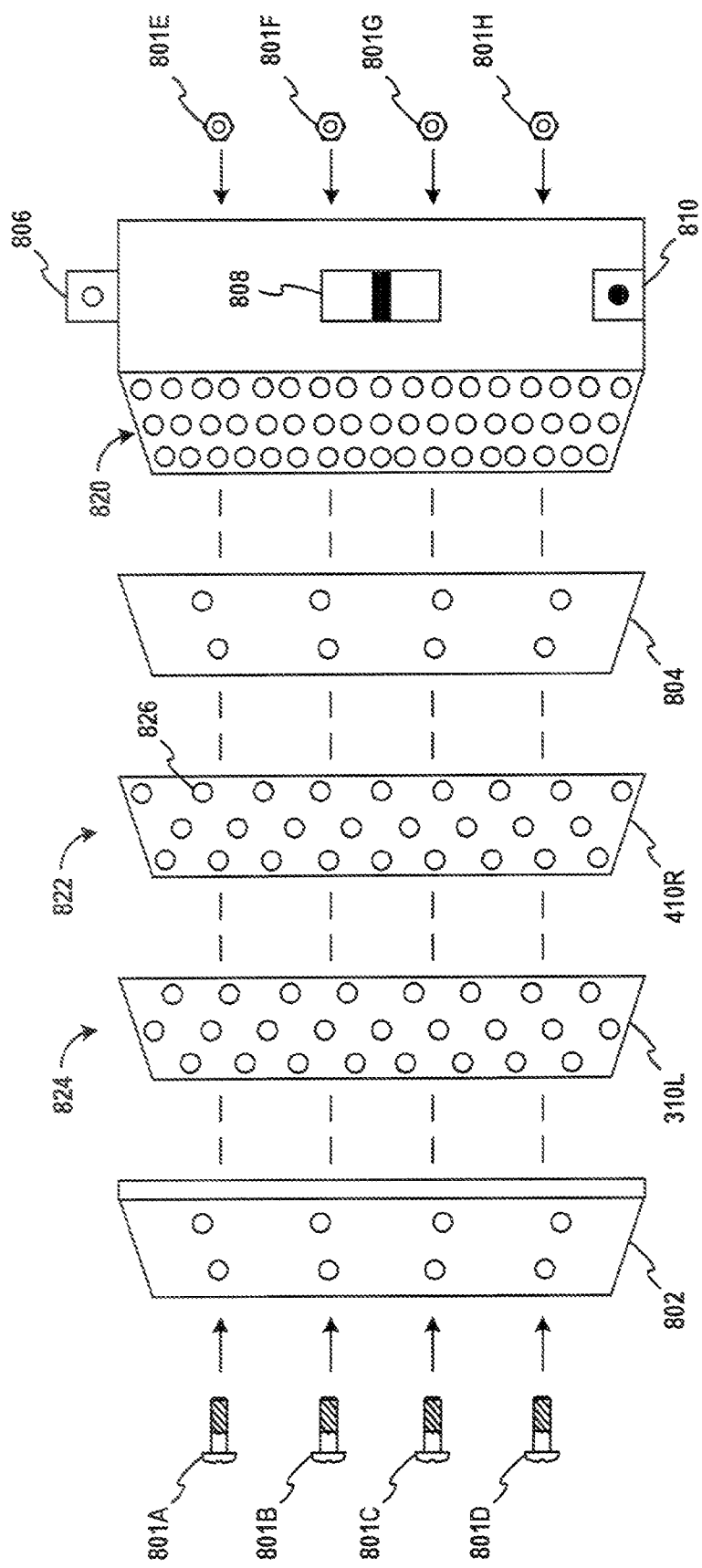
FIG. 8A shows a side perspective view of a detailed enlargement of an LED module, according to one embodiment.

FIG. 8A shows a side perspective view of a detailed enlargement of the example LED module 53. As shown, FIG. 8A shows, inter alia, four of the eight mounting fasteners, namely mounting fasteners 801A-D, a front diffuser 802 (e.g. a front diffusion sheet), a left polarizing overlay 310L with an array of pre-registered openings, a right polarizing overlay 410R with an array of pre-registered openings, a rear diffuser 804 (e.g. a rear diffusion sheet), an array of LED, and four of the eight mounting fasteners, namely mounting fasteners 801E-H. In some cases, a left polarizing overlay 310L and/or a right polarizing overlay 410R may comprise polarizing sheets that generate circularly polarized light. In other cases, a left polarizing overlay 310L and/or a right polarizing overlay 410R may comprise polarizing sheets that generate linearly polarized light.

The top locking fastener 806 is one of a plurality of locking fasteners that match up to the other locking fasteners for holding individual modules together. The middle locking fastener 808 is a locking fastener for holding individual modules together in horizontal rows. In the embodiment of FIG. 8A, there is a matching "coffin latch" fastener (not shown) on the other side of the modules. The bottom locking fastener 810 is one of a plurality of locking fasteners that match up to the other locking fasteners for holding individual modules together.

More formally, an exemplary embodiment (corresponding substantially to FIG. 8A) may be described as: A 3D stereoscopic display system for large format LED displays comprising a plurality of light emitting diodes 820 for displaying 3D image content. The 3D stereoscopic display system is constructed by overlaying (over the plurality of light emitting diodes 820) a first sheet of polarizing material 822 for polarizing a first subset of the LEDs to form a first view of the 3D image, the first sheet comprising a plurality of openings 826 substantially aligned with a second subset of the LEDs. The stereoscopic display system is further constructed by overlaying (over the plurality of light emitting diodes 820) a second sheet of polarizing material 824 for polarizing the second subset of the LEDs to form a second view of the 3D image, the second sheet comprising a plurality of openings 826 substantially aligned with the first subset of the LEDs.

In one embodiment, the assembly comprises a rear diffuser 804 disposed between an array of LEDs (e.g. LED module 53) and the first sheet of polarizing material for diffusing luminance of light emanated from said LEDs. In some situations, using a rear diffuser 804 for diffusing luminance of light emanated from said LEDs further serves to reduce the concentration of light from a small to a larger area of the polarizing material, so as to increase the efficiency of the polarizing material and to reduce ghosting artifacts that might interfere with the 3D effect.

In another embodiment, the assembly comprises a front diffuser 802 disposed in front of a sheet of polarizing material for reducing glare from light emanated from light sources external from the array of LEDs. An assembly including a display with a front diffuser may be constructed for reducing glare from light emanated from light sources external from the display. Such an assembly may be constructed by disposing a front diffuser in front of the second sheet of polarizing material 824. Using this diffusion technique serves for increasing the viewing angle of the display by projecting a polarized image of an illuminated pixel through the front diffuser material (and reaching onto the front surface of the front diffuser material) thereby diffusing luminance of light emanated from said LEDs, so as to be visible by a viewer at a wide angle.

A rear diffuser 804 may be used in combination with a front diffuser 802 for producing visual effects. In particular, a rear diffuser 804 may be disposed between the display and the first sheet of polarizing material 822 and in combination with a front diffuser, disposed in front of the second sheet of polarizing material 824, wherein, the combination of the front and rear diffusers create a larger size illumination area (as compared to the LED pixels alone), which serves to decrease the pixilation effects of the display and create a smoother visual image in 2D or 3D modes of use.

Figure 8B:
FIG. 8B shows a top view of a detailed enlargement of a pair of LEDs, according to one embodiment.

FIG. 8B shows a top view of a detailed enlargement of a pair of LEDs, according to one embodiment. As shown, a pair of LEDs is keyed using a slot or indentation for indicating readiness for fitting to either a left eye polarizer or to a right eye polarizer. In particular, an LED intended for illumination of a pixel for left eye view (left eye polarization) might be keyed with a left-facing key 832. Similarly, an LED intended for illumination of a pixel for the right eye view (right eye polarization) might be keyed with a right-facing key 836. The electronic light emitting diode device 830 may be mounted to a substrate or a printed circuit board, and may be housed by an LED housing 835 formed from a rigid or semi-rigid material, which material may be transparent or translucent, or clear, or colored. In some embodiments, the shape of the LED housing 835 may include a rounded or oblong shape. The top surface of the LED housing may be polished or roughed or frosted, depending on the specific application. In particular, top surface of the LED housing may be frosted to improve adhesion characteristics, and/or for enhancing the view angle and overall smoothness of the display.

Figure 8C:
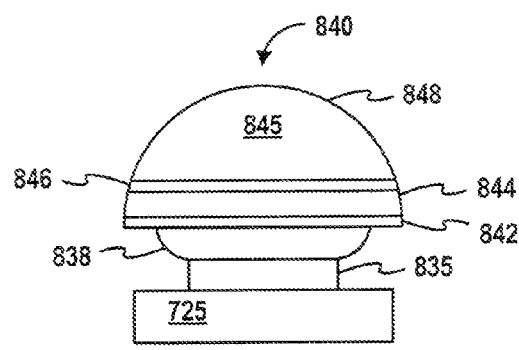
FIG. 8C shows a side view of a detailed enlargement of an LED fitted with a button polarizer, according to one embodiment.

FIG. 8C shows a side view of a detailed enlargement of an LED housing 835 fitted with a button polarizer 840. As shown, a button polarizer 840 is fitted to an LED, and the button polarizer 840 fitted to an LED is mounted to a substantially planar assembly for a 3D stereoscopic display system for large format LED displays comprising a grid of pixels 725 for displaying 3D image content. Of course, the assembly together with the grid of pixels 725 may take shapes other than planar shapes, such as curves or arbitrarily-shaped surfaces, even surfaces forming volumes. Analogous to the sheet-oriented embodiment of FIG. 8A, the embodiment of FIG. 8C uses a rear diffuser 842, a layer of polarizing material 846, and a front diffuser, for example front button diffuser 845. The button diffuser surface 848 may be polished or roughed or frosted, depending on the specific application. In some cases, the button polarizer 840 may fitted to an LED via an adhesive layer 838. Of course any of a wide variety of adhesives are sufficiently adhesive, even when the adhesive layer 838 is very thin so as to be transparent or translucent. It is also reasonable and envisioned that an adhesive layer 838 be formed using a epoxy or other compound that cures into a rigid or semi-rigid material, which cured compound may be transparent or translucent, or clear, or colored.

Figure 8D:
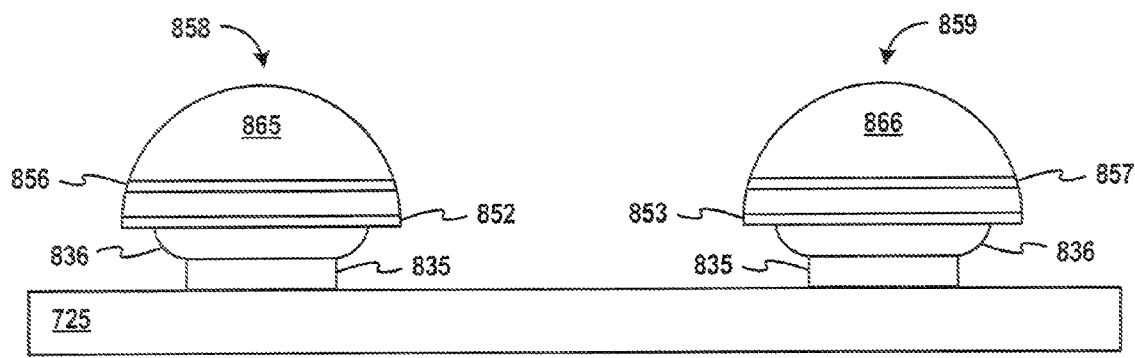
FIG. 8D shows a side view of a detailed enlargement of pair of LEDs fitted with a button polarizer, according to one embodiment.

FIG. 8D shows a side view of a detailed enlargement of pair of LEDs, each fitted with a button polarizer (e.g. left button polarizer 858, right button polarizer 859). As shown, a left button polarizer 858 is fitted to an LED having a left-facing key. Similarly, a right button polarizer 859 is fitted to an LED having a right-facing key. The figure depicts a portion of an assembly for a 3D stereoscopic display system for large format LED displays comprising a grid of pixels 725 for displaying 3D image content. The grid of pixels is organized as pairs of LEDs, each fitted with a button polarizer 840, more specifically one of a pair of LEDs comprises a left button polarizer 858 fitted to an LED having a left-facing key, and the other of the pair of LEDs comprises a right button polarizer 859 is fitted to an LED having a right-facing key. Analogous to the sheet-oriented embodiment of FIG. 8A, the embodiment of FIG. 8D uses a rear button diffuser, a polarizing layer, and a front button diffuser, although a rear button diffuser and/or a front button diffuser may be omitted. A left button polarizer 858 may be manufactured or assembled in layers, for example, comprising a left-view rear diffuser 852, a left-view polarizing layer 856, and a left-view button diffuser 865. A right button polarizer 859 may be manufactured or assembled in layers, for example, comprising a right-view rear diffuser 853, a right-view polarizing layer 857, and a right-view button diffuser 866. Of course, a left button polarizer 858 may be manufactured including a left-view polarizing layer 856, which left-view polarizing layer might be formed of a polarizing material that generates polarized light. For producing left views, a left-view polarizing layer 856 may comprise polarizing material that generates circularly polarized light. In other cases, left-view polarizing layer 856 may comprise polarizing material that generates linearly polarized light. For producing right views, a right-view polarizing layer 857 may comprise polarizing material that generates circularly polarized light. In other cases, right-view polarizing layer 857 may comprise polarizing material that generates linearly polarized light. Of course, for manufacturing purposes, the left-view polarizing layer 856 and the right-view polarizing layer 857 might be of the same polarizing material, and the left-view and right-view attributes imparted merely by assigning different keys (e.g a left-facing key, a right-facing key) to different buttons.

More formally, an exemplary embodiment (corresponding substantially to FIG. 8D) may be described as: A 3D stereoscopic display system for large format LED displays comprising a display having a plurality of light emitting diodes (LEDs) for displaying 3D image content, over which LEDs are disposed (1) a plurality of first button polarizers for polarizing a first subset of the LEDs to form a first view of said 3D image, at least one of said plurality of first button polarizers substantially aligned with at least one of said first subset of said LEDs, and (2) a plurality of second button polarizers for polarizing a second subset of said LEDs to form a second view of said 3D image, at least one of the plurality of second button polarizers substantially aligned with at least one of said second subset of said LEDs. In exemplary cases, the first button polarizers are substantially keyed with the individual LEDs from among the first subset of the LEDs, and the second button polarizers are substantially keyed with the individual LEDs from among the second subset of the LEDs.

In one embodiment, a button polarizer comprises a rear diffuser 842 suitable to be affixed to the face of a keyed LED housing. In some situations, using a rear diffuser 842 for diffusing luminance of light emanated from said LEDs further serves to reduce the concentration of light from a small to a larger area of the polarizing material 846, so as to increase the efficiency of the polarizing material and to reduce ghosting artifacts that might interfere with the 3D effect.

For forming a 3D image, the plurality of first button polarizers comprises polarizing material for polarizing light in a first polarizing direction (i.e. for creating a left eye view channel) and the second button polarizers comprises polarizing material for polarizing light in a second polarizing direction (i.e. for creating a right eye view channel).

In another embodiment, the assembly comprises a front button diffuser 845 disposed in front of a layer of polarizing material 846. Using this diffusion technique serves for increasing the viewing angle of the display by projecting a polarized image of an illuminated pixel through the front button diffuser material (and reaching onto the front surface 848 of the front button diffuser material) thereby diffusing luminance of light emanated from said LEDs, so as to be visible by a viewer at a wide angle. In some cases a front button diffuser might include a frosted surface.

As may now be understood, a display assembly 100, may be comprised of an LED array comprised of a plurality individual LEDs, affixed with a button diffuser. Of course, an LED array may be comprised of a plurality individual LEDs or it may be comprised of a plurality LED modules (each LED within the LED module affixed with a button diffuser), which array of modules comprises the arrayed display, namely display assembly 100.

Figure 9A:
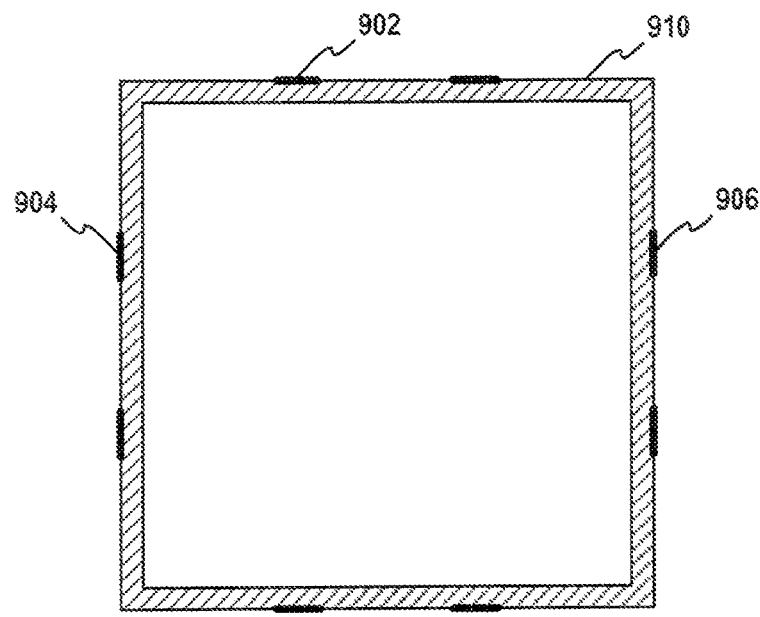
FIG. 9A presents a front plan view of a mounting frame suitable for the retention of polarizing film sheets or polarizing film strips to an LED display section, according to one embodiment.

FIG. 9A presents a front plan view of a mounting frame 910 suitable for the retention of polarizing film sheets or polarizing film strips to an LED module. Locking tabs (e.g. locking tab 902, locking tab 904 and locking tab 906 are shown in a position as in a finished assembly.

Figure 9B:
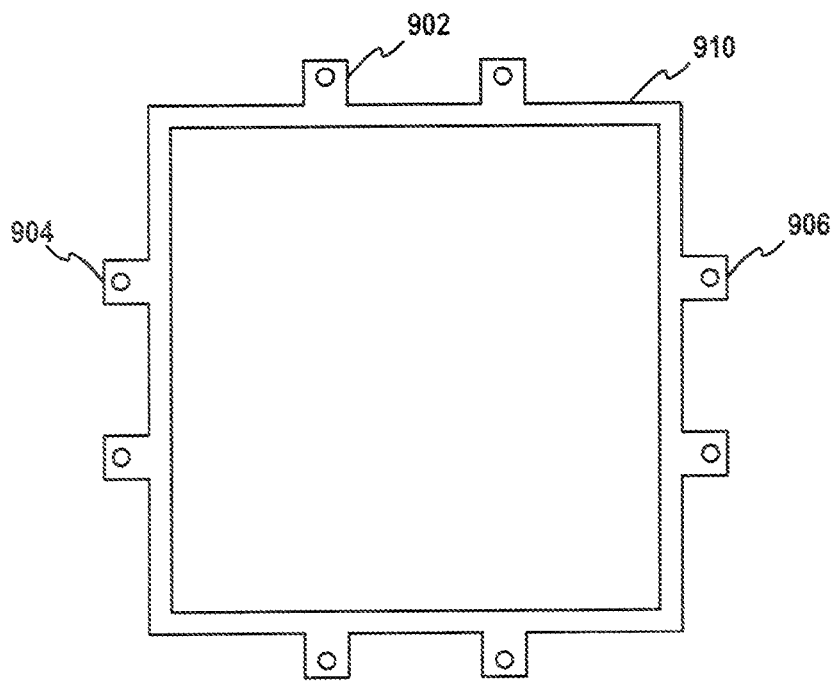
FIG. 9B shows a front plan view of a mounting frame with locking tabs in an unfinished or flat position, according to one embodiment.

FIG. 9B shows a front plan view of a mounting frame with locking tabs in an unfinished or flat position. That is, FIG. 9B depicts a mounting frame 910 presented in a stamped condition without any rotation or bending of the locking tabs (e.g. locking tab 902, locking tab 904, and locking tab 906). The mounting frame may be stamped from a single sheet of aluminum, steel or other material. After initial fabrication, the locking tabs may be bent, pivoted, riveted or otherwise manipulated to form a latching strip. In some embodiments, the locking tabs are manipulated to form a 90 degree angle from the face of the frame.

Figure 9C:
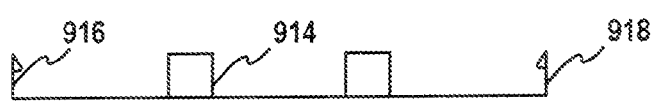
FIG. 9C shows an elevation view of a section of mounting frame with locking tabs in a finished position, according to one embodiment.

FIG. 9C shows an elevation view of a section of mounting frame with locking tabs in a finished position. That is, FIG. 9C presents an elevation view of a mounting frame 910 with the locking tabs locking tab (e.g. locking tab 916, locking tab 914, and locking tab 918 in a bent condition.

Figure 10:
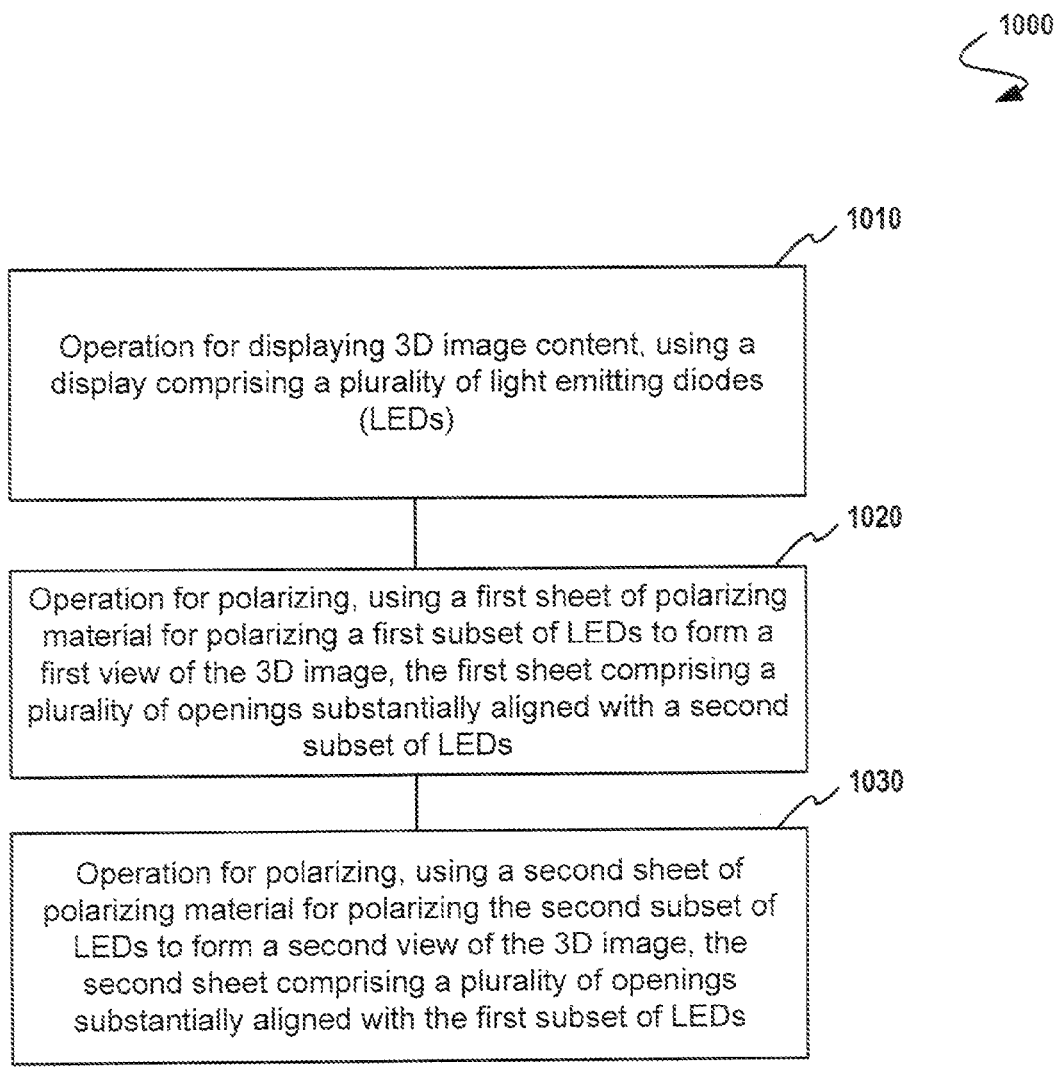
FIG. 10 depicts a block diagram of a method for displaying a 3D image from a wall, according to one embodiment.

FIG. 10 depicts a block diagram of a method for displaying a 3D image from a wall. As an option, the present method 1000 may be implemented in the context of the architecture and functionality of the embodiments described herein. Of course, however, the method 1000 or any operation therein may be carried out in any desired environment. The method shown implements displaying a 3D image from a wall by displaying 3D image content using a display comprising a plurality of light emitting diodes (see operation 1010), the method 1000 also comprising an operation for polarizing a first subset of the LEDs with a first sheet of polarizing material to form a first view of the 3D image, the first sheet comprising a plurality of openings substantially aligned with a second subset of the LEDs (see operation 1020). The method 1000 also comprising an operation for polarizing the second subset of the LEDs with a second sheet of polarizing material to form a second view of the 3D image, the second sheet comprising a plurality of openings substantially aligned with the first subset of the LEDs (see operation 1030).

Figure 11:
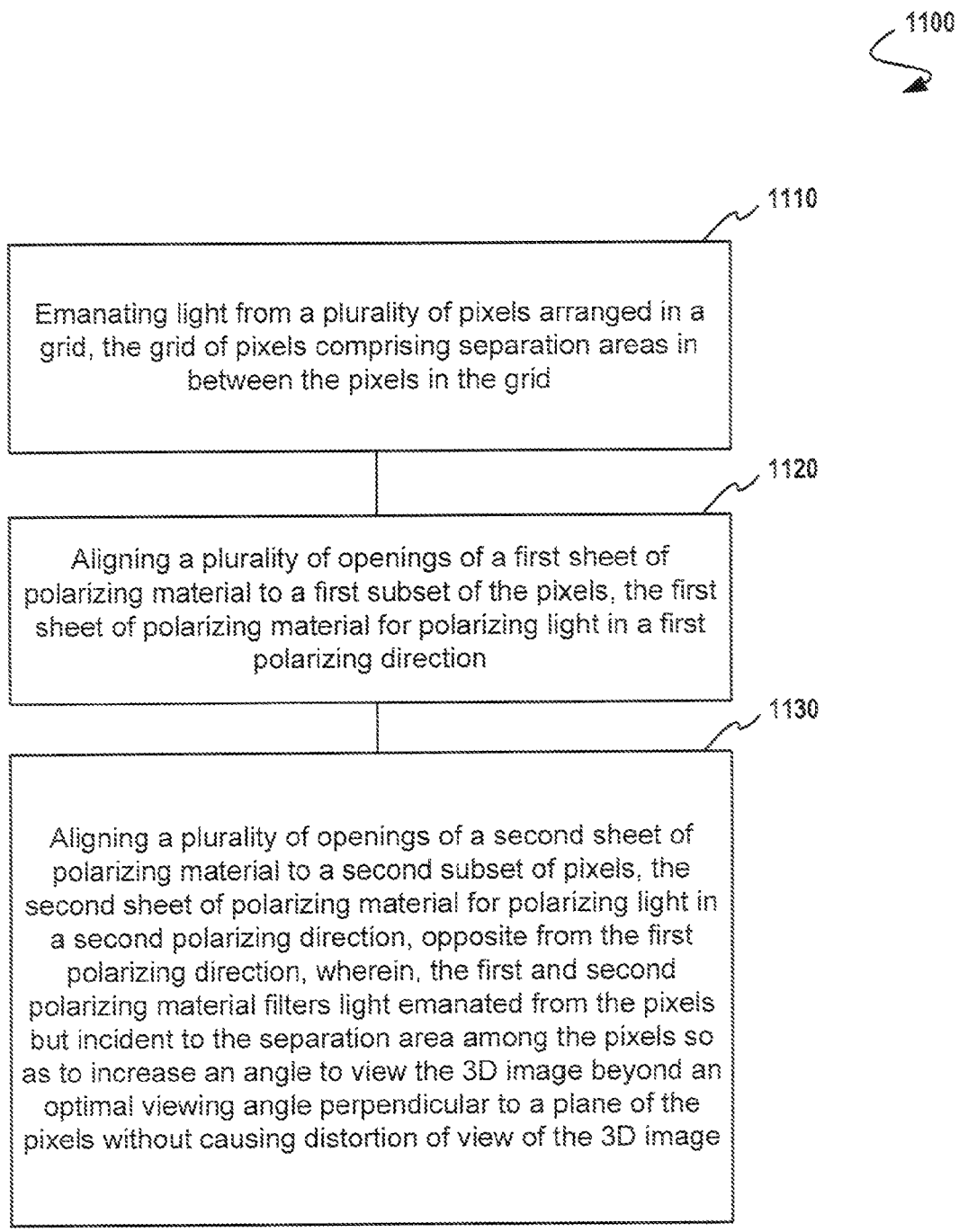
FIG. 11 depicts a block diagram of a method for displaying a 3D image from a wall so as to increase an angle to view the 3D, according to one embodiment.

FIG. 11 depicts a block diagram of a method for viewing a 3D image from a wall so as to increase an angle to view the 3D. As an option, the present method 1100 may be implemented in the context of the architecture and functionality of the embodiments described herein. Of course, however, the method 1100 or any operation therein may be carried out in any desired environment. As shown, method 1100 implements operations for viewing a 3D image, the method 1100 comprising operations for: emanating light from a plurality of pixels arranged in a grid, the grid of pixels comprising separation areas in between the pixels in the grid (see operation 1110); aligning a plurality of openings of a first sheet of polarizing material to a first subset of the pixels, the first sheet of polarizing material for polarizing light in a first polarizing direction (see operation 1120); and aligning a plurality of openings of a second sheet of polarizing material to a second subset of pixels, the second sheet of polarizing material for polarizing light in a second polarizing direction, opposite from the first polarizing direction, wherein, the first and second polarizing material filters light emanated from the pixels but incident to the separation area among the pixels so as to increase an angle to view the 3D image beyond an optimal viewing angle perpendicular to a plane of the pixels without causing distortion of view of the 3D image (see operation 1130).

Figure 12:
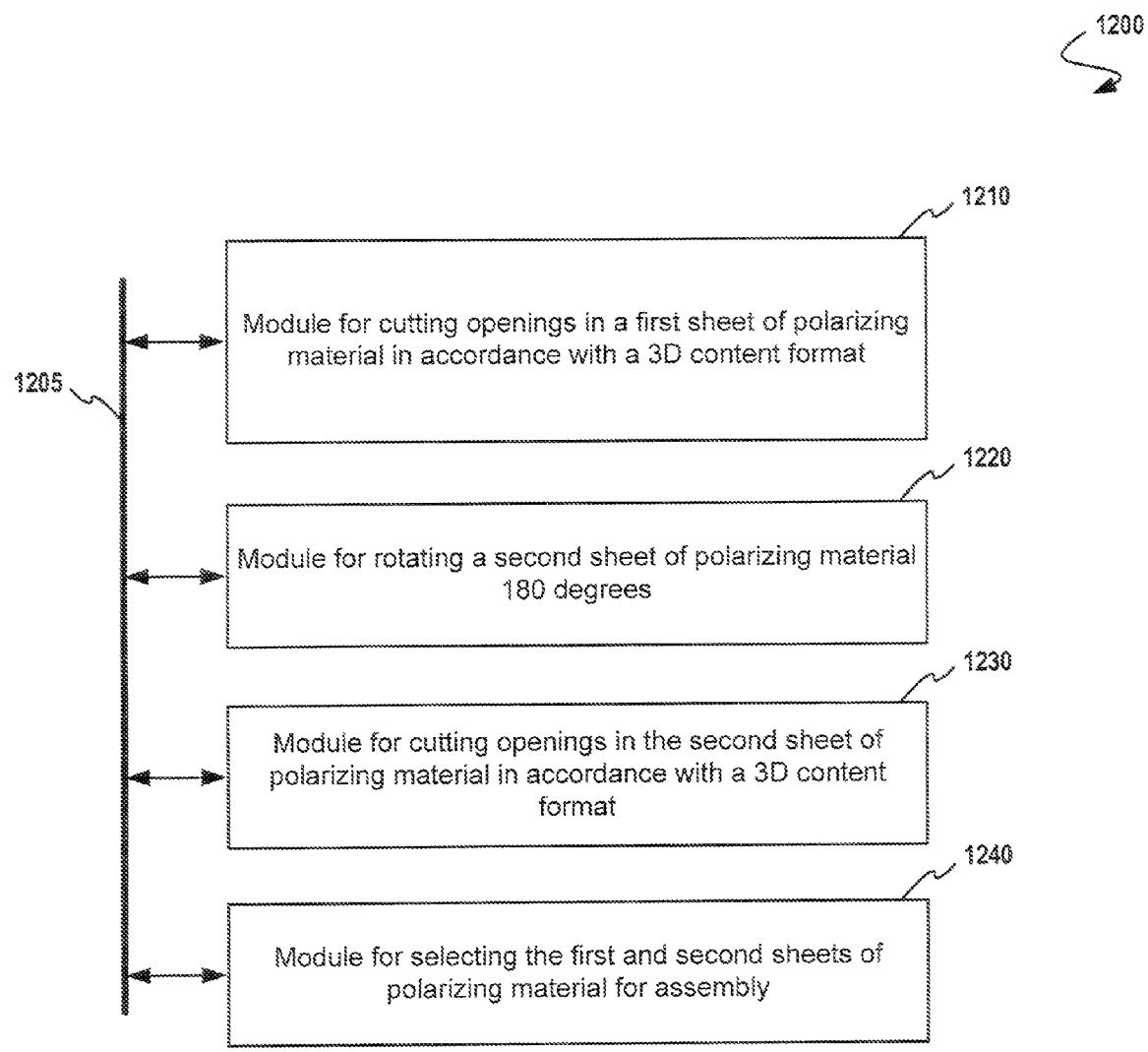
FIG. 12 depicts a block diagram of a system for fabricating a polarizer, according to one embodiment.

FIG. 12 depicts a block diagram of a system for fabricating a polarizer. As an option, the present system 1200 may be implemented in the context of the architecture and functionality of the embodiments described herein. Of course, however, the system 1200 or any operation therein may be carried out in any desired environment. As shown, system 1200 includes a plurality of modules, each connected to a communication link 1205, and any module can communicate with other modules over communication link 1205. The modules of the system can, individually or in combination, perform method steps within system 1200. System 1200 implements a method for fabricating a polarizer, the system 1200 comprising modules for: stacking a plurality of sheets of polarizing material (see module 1210); cutting openings in a first sheet of polarizing material in accordance with a 3D content format (see module 1220); rotating a second sheet of polarizing material 180 degrees (see module 1230); cutting openings in the second sheet of polarizing material in accordance with a 3D content format (see module 1240); and selecting the first and second sheets of polarizing material for assembly (see module 1250). Of course, operations carried out in system 1200 may be repeated, or carried out in various alternative orders, thus, it is reasonable and envisioned that successive operations might include repeating a cutting operation, repeating a rotating operation, and/or repeating a selecting operation, and of the preceding operations performed upon any of a plurality of sheets or performed upon a plurality of pairs of sheets of polarizing material.

It is to be understood that embodiments of this invention may be implemented using a set of instructions executed upon some form of processing core (such as the CPU of a computer) or otherwise implemented or realized upon or within a machine- or computer-readable medium. A machine-readable medium includes any mechanism for storing or transmitting information in a form readable by a machine (e.g. a computer). For example, a machine-readable medium includes read-only memory (ROM); random access memory (RAM); magnetic disk storage media; optical storage media; flash memory devices; electrical, optical or acoustical or any other type of tangible media suitable for storing information.

What is claimed is:

1. An apparatus comprising:
   a) a display comprising a plurality of light emitting diodes (LEDs) for displaying 3D image content;
   b) a first sheet of polarizing material for polarizing a first subset of said LEDs to form a first view of said 3D image, said first sheet comprising a plurality of openings substantially aligned with a second subset of said LEDs;
   c) a second sheet of polarizing material for polarizing said second subset of said LEDs to form a second view of said 3D image, said second sheet comprising a plurality of openings substantially aligned with said first subset of said LEDs, wherein said first sheet and second sheet are layered together;
   d) a rear diffuser disposed between said display and said first sheet of polarizing material, for diffusing luminance of light emanated from said LEDs to reduce the concentration of light from a small to a larger area of the polarizing material, so as to increase the efficiency of the polarizing material to reduce the ghosting artifacts that interfere with the 3D effect;
   e) a front diffuser, disposed in front of said second sheet of polarizing material, for reducing glare from the light emanated from light sources external from said display and for increasing the viewing angle of the display by projecting a polarized image of an illuminated pixel onto the front surface on the front diffuser so as to be visible by a viewer at a wide angle; and
   f) eyewear for viewing said 3D image, said eyewear comprising a left and a right lens that polarizes light complementary to said first and second sheets of polarizing material to create a left eye view and a right eye view from said first and second views.

2. The apparatus of claim 1, wherein said first sheet of polarizing material and said second sheet of polarizing material generates circularly polarized light.

3. The apparatus of claim 1, wherein said first sheet of polarizing material and said second sheet of polarizing material generates linearly polarized light.

4. The apparatus of claim 1, wherein said LEDs are disposed in a grid pattern and wherein said first view comprises LEDs situated in a first set of alternating horizontal rows and said second view comprises LEDs situated in a second set of alternating horizontal rows opposite said first set of alternating horizontal rows.

5. The apparatus of claim 1, wherein said LEDs are disposed in a grid pattern and wherein said first view comprises LEDs situated in a first set of alternating diagonal lines across said grid and said second view comprises LEDs situated in a second set of alternating diagonal lines across said grid, opposite said first set of alternating diagonal rows.

6. A method for displaying a 3D image from a wall comprising a plurality of light emitting diodes (LEDs), said method comprising:
   a) polarizing a first subset of said LEDs with a first sheet of polarizing material to form a first view of said 3D image, said first sheet comprising a plurality of openings substantially aligned with a second subset of said LEDs;
   b) polarizing said second subset of said LEDs with a second sheet of polarizing material to form a second view of said 3D image, said second sheet comprising a plurality of polarizing material to form a second view of said 3D image, said second sheet comprising a plurality of openings substantially aligned with said first subset of said LEDs, wherein said second sheet is layered together with said first sheet;
   c) diffusing luminance of light emanated from said LEDs rear diffuser, the rear diffuser disposed between said display and said first sheet of polarizing material to reduce the concentration of light from a small to a large area of the polarizing material, so as to increase the efficiency of the polarizing material and to reduce the ghosting artifacts that interfere with the 3D effect;
   d) reducing glare from light emanated from light sources external from said display with a front diffuser, the front diffuser disposed in front of said second sheet of polarizing material;
   e) increasing the viewing angle of the display with the front diffuser by projecting a polarized image of an illuminated pixel onto the front surface on the front diffuser so as to be visible by a view at a wide angle;
   f) using the combination of the front and rear diffusers to create a larger size illumination area, as compared to the LED pixels alone, to decrease the pixilation effects of the display and to create a smoother image in 2D or 3D modes of use; and g) using eyewear for viewing said 3D image, said eyewear comprising a left and a right lens that polarizes light complementary to said first and second sheets of polarizing material to create a left eye view and a right eye view from said first and second views.

7. The method of claim 6, wherein said first sheet of polarizing material and said second sheet of polarizing material generates circularly polarized light.

8. The method of claim 6, wherein said first sheet of polarizing material and said second sheet of polarizing material generates linearly polarized light.

9. The method of claim 6, wherein said LEDs are disposed in a grid pattern and wherein said first view comprises LEDs situated in a first set of alternating horizontal rows and said second view comprises LEDs situated in a second set of alternating horizontal rows opposite said first set of alternating horizontal rows.

10. The method of claim 6, wherein said LEDs are disposed in a grid pattern and wherein said first view comprises LEDs situated in a first set of alternating diagonal lines across said grid and said second view comprises LEDs situated in a second set of alternating diagonal lines across said grid, opposite said first set of alternating diagonal rows.

11. An apparatus comprising:
a) a display comprising a plurality of light emitting diodes (LEDs) for displaying 3D image content;
b) a plurality of first button polarizers for polarizing a first subset of said LEDs to form a first view of said 3D image, at least one of said plurality of first button polarizers substantially aligned with at least one of said first subset of said LEDs;
c) plurality of second button polarizers for polarizing a second subset of said LEDs to form a second view of said 3D image, at least one of the plurality of second button polarizers substantially aligned with at least one of said second subset of said LEDs, wherein said second button polarizers are layered upon said first button polarizers;
d) at least one of said plurality of first button polarizers comprises a frosted surface;
e) at least one of said plurality of first button polarizers comprise a left-facing key and wherein at least one of said plurality of second button polarizers comprises a right-facing key; and
f) at least one of said plurality of first button polarizers comprises polarizing material for polarizing light in a first polarizing direction; and wherein at least one of said plurality of second button polarizers comprise polarizing material for polarizing light in a second polarizing direction.

* * * * *